United States Patent
Faulkner

(10) Patent No.: US 9,743,042 B1
(45) Date of Patent: Aug. 22, 2017

(54) COMMUNICATION EVENT

(71) Applicant: Microsoft Technology Licensing, LLC, Redmond, WA (US)

(72) Inventor: Jason Thomas Faulkner, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/048,800

(22) Filed: Feb. 19, 2016

(51) Int. Cl.
*H04N 7/15* (2006.01)
*H04N 7/14* (2006.01)
*H04L 29/06* (2006.01)

(52) U.S. Cl.
CPC ......... *H04N 7/147* (2013.01); *H04L 65/1063* (2013.01); *H04L 65/403* (2013.01); *H04L 65/601* (2013.01); *H04N 7/15* (2013.01)

(58) Field of Classification Search
CPC  H04N 7/14; H04N 7/146; H04N 7/15; H04N 21/23424; H04N 21/4406; H04N 7/152
USPC .......................................... 348/14.01–14.16
See application file for complete search history.

(56) References Cited

U.S. PATENT DOCUMENTS

| | | | |
|---|---|---|---|
| 6,611,281 | B2 | 8/2003 | Strubbe |
| 6,894,714 | B2 | 5/2005 | Gutta et al. |
| 8,169,463 | B2 | 5/2012 | Enstad et al. |
| 8,842,161 | B2 | 9/2014 | Feng et al. |
| 2003/0090564 | A1 | 5/2003 | Strubbe |
| 2006/0251382 | A1 | 11/2006 | Vronay et al. |
| 2009/0256901 | A1* | 10/2009 | Mauchly ............ H04N 5/45 348/14.07 |
| 2010/0220172 | A1* | 9/2010 | Michaelis ............ H04N 7/147 348/14.08 |
| 2012/0127262 | A1* | 5/2012 | Wu .................... H04N 7/152 348/14.09 |
| 2012/0182377 | A1 | 7/2012 | Wang et al. |
| 2013/0222529 | A1 | 8/2013 | Decker et al. |

(Continued)

FOREIGN PATENT DOCUMENTS

WO    WO-2016168154    10/2016

OTHER PUBLICATIONS

"Configuring Conference Management Settings for the Cisco Unified Videoconferencing 5000 MCU", Retrieved on: Dec. 25, 2015—Available at: http://www.cisco.com/c/en/us/td/docs/video/cuvc/7_0/configuration_guide/mcu_config/conferences.pdf, 10 pages.

(Continued)

*Primary Examiner* — Melur Ramakrishnaiah

(57) ABSTRACT

In a communication event between a first user and one or more second users via a communication network. A plurality of video streams is received via the network at a computer connected to the network. Each of the streams carries a respective moving image of at least one respective user. The computer causes the respective moving image of a first of the video streams to be displayed at a user device of the first user for a first time interval. The computer detects, in the respective moving image of a second of the video streams that is not displayed at the user device in the first time interval, a change in the visual content thereof. In response to detecting said change in the visual content, the computer causes at least the second video stream to be displayed at the user device for a second time interval.

20 Claims, 19 Drawing Sheets

(56) References Cited

U.S. PATENT DOCUMENTS

| | | | |
|---|---|---|---|
| 2014/0085404 A1* | 3/2014 | Kleinsteiber | H04N 7/15 348/14.08 |
| 2015/0049162 A1 | 2/2015 | Kurupacheril et al. | |
| 2015/0138308 A1* | 5/2015 | Berrett | H04N 7/141 348/14.13 |
| 2015/0288926 A1* | 10/2015 | Glass | H04N 5/265 348/14.09 |
| 2015/0296178 A1 | 10/2015 | Aarrestad et al. | |

OTHER PUBLICATIONS

"International Search Report and Written Opinion", Application No. PCT/US2017/017281, Apr. 25, 2017, 14 pages.

* cited by examiner

| Movement | Priority | Time Interval | Other parameters |
|---|---|---|---|
| M1 | P1 | T1 | X1 |
| M2 | P2 | T2 | X2 |
| M3 | P3 | T3 | X3 |
| ... | ... | ... | ... |

FIG. 4A

| Change in no. of users | Priority | Time Interval | Other parameters |
|---|---|---|---|
| D1 | P1 | T1 | X1 |
| D2 | P2 | T2 | X2 |
| D3 | P3 | T3 | X3 |
| D4 | P4 | T4 | X4 |
| D5 | P5 | T5 | X5 |

FIG. 4B

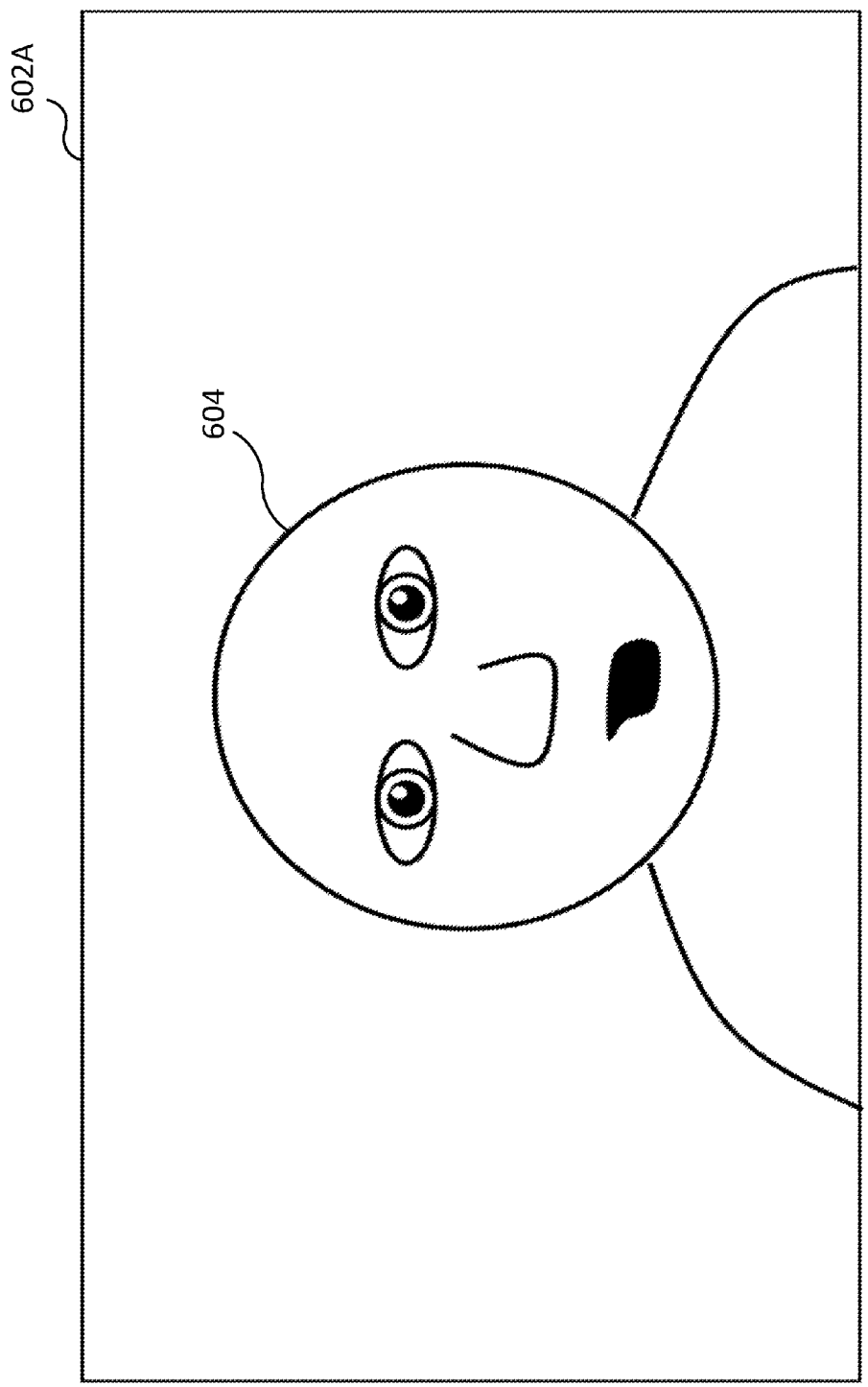

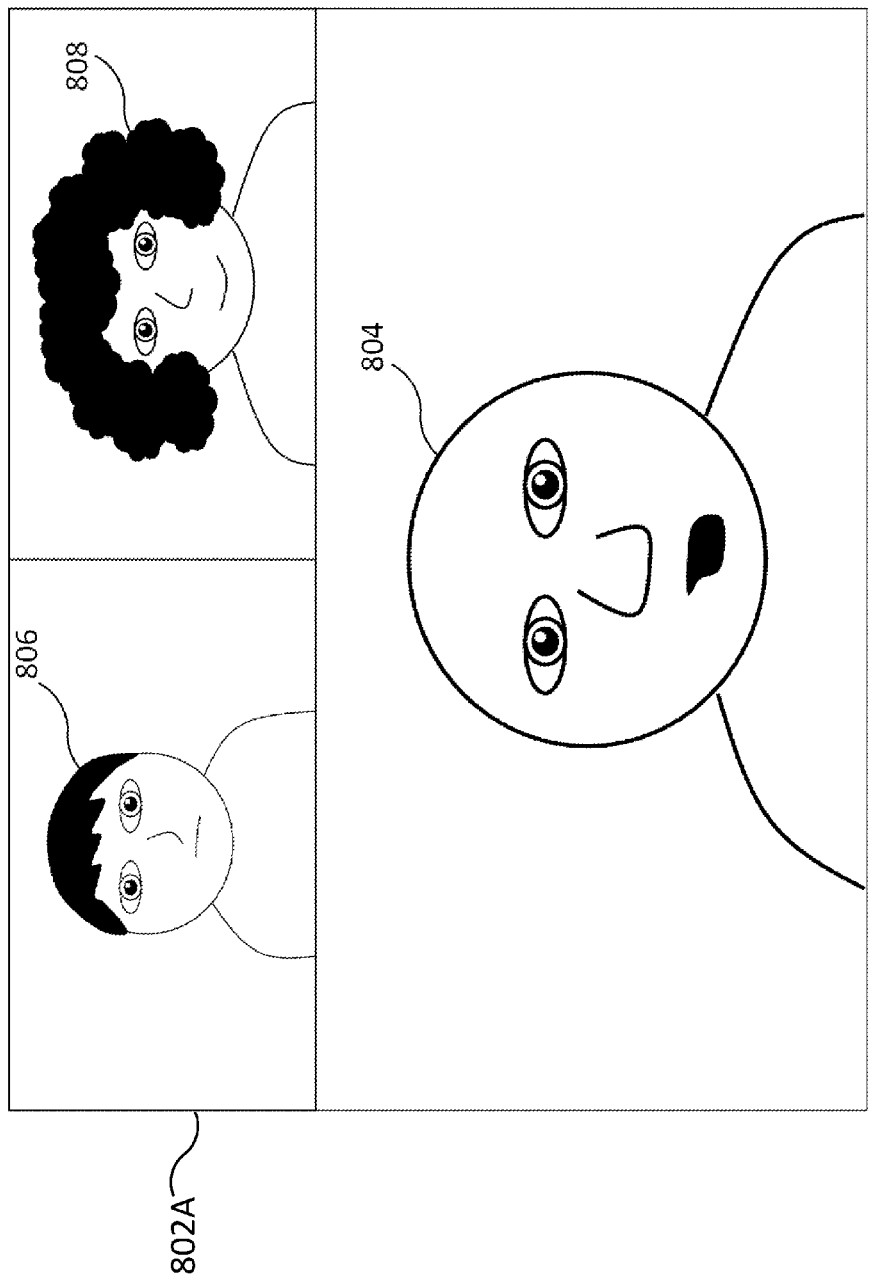

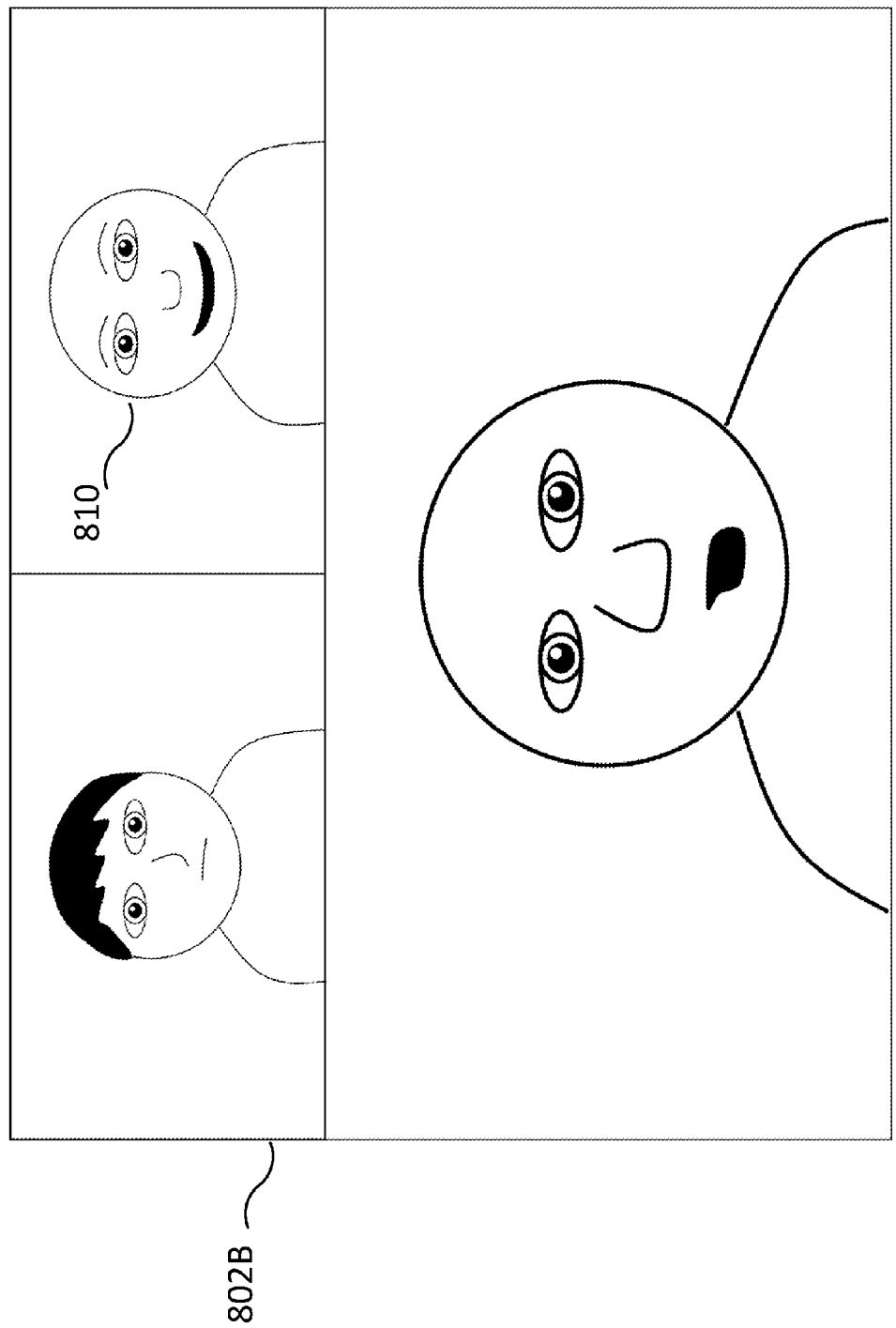

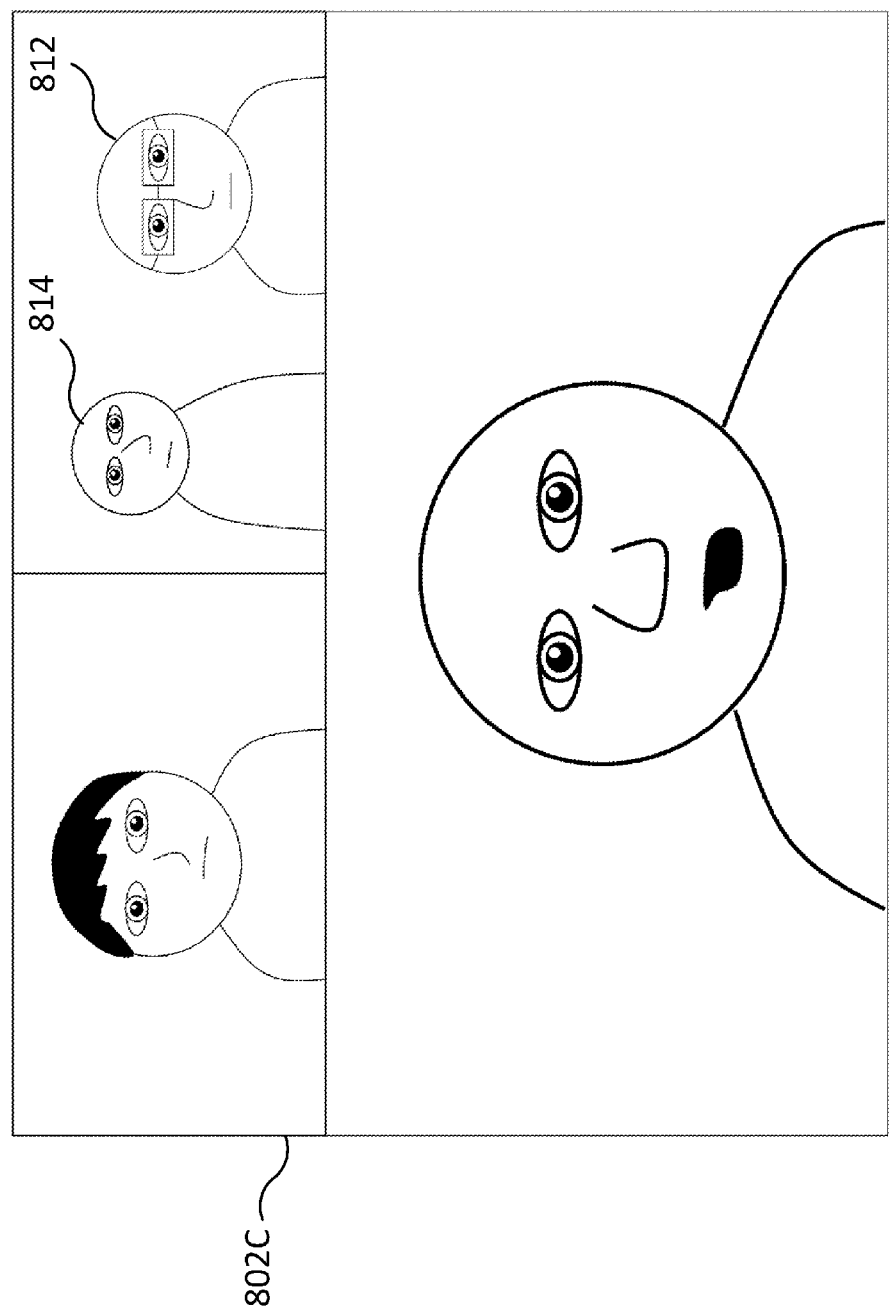

US 9,743,042 B1

COMMUNICATION EVENT

BACKGROUND

Voice over internet protocol ("VoIP") communication systems allow the user of a device to make calls across a communication network. To use VoIP, the user must install and execute client software on their device. The client software provides the VoIP connections as well as other functions such as registration and authentication. Advantageously, in addition to voice and video communication, the client may also provide video calling and instant messaging ("IM"). With video calling, the callers are able to view video images (i.e. moving images) of the other party in addition to voice information. This enables a much more natural communication between the parties, as facial expressions are also communicated, thereby making video calls more comparable to a face-to-face conversation.

A video call comprising multiple users may be referred to as a "video conference". In a conventional video conference, each participant (i.e. user) is able to view the video images of one or more of the other participants (users) in the video conference. For example, as a default setting, each user may be presented with the video images of all of the other users in the video conference. These may displayed, for example, using a grid, with each video image occupying a different location on the grid. Alternatively, each user may be presented with one or more video images corresponding to users that have been detected as speaking users. That is, the detection of audio from a speaker may determine which of the video images of the other users are selected for display at a particular user's user terminal. Typically, in a video conference, one user speaks at a time, and so this may result in a single video image of that user being displayed to each of the non-speaking users.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various aspects of the present subject matter relate to a communication event between a first user and one or more second users via a communication network. A plurality of video streams is received via the network at a computer connected to the network. Each of the streams carries a respective moving image of at least one respective user. The computer causes the respective moving image of a first of the video streams to be displayed at a user device of the first user for a first time interval. The computer detects, in the respective moving image of a second of the video streams that is not displayed at the user device in the first time interval, a change in the visual content thereof. In response to detecting said change in the visual content, the computer causes at least the second video stream to be displayed at the user device for a second time interval.

BRIEF DESCRIPTION OF FIGURES

For a better understanding of the present subject matter, and to show how embodiments of the same may be carried into effect, reference is made to the following figures in which:

FIG. 4A shows a schematic illustration of a computer implemented database that may be used to determine a priority associated with a video stream, based on an identified reaction in the moving image of the video stream.

FIG. 4B shows a schematic illustration of a computer implemented database that may be used to determine a priority associated with a video stream, based on a detected change in the number of users in the moving image of the video stream.

FIGS. 6A to 8C show various illustrations of a graphical user interface of a client, at different stages during a video call between a group of three or more users;

DESCRIPTION OF EMBODIMENTS

Figure 1:
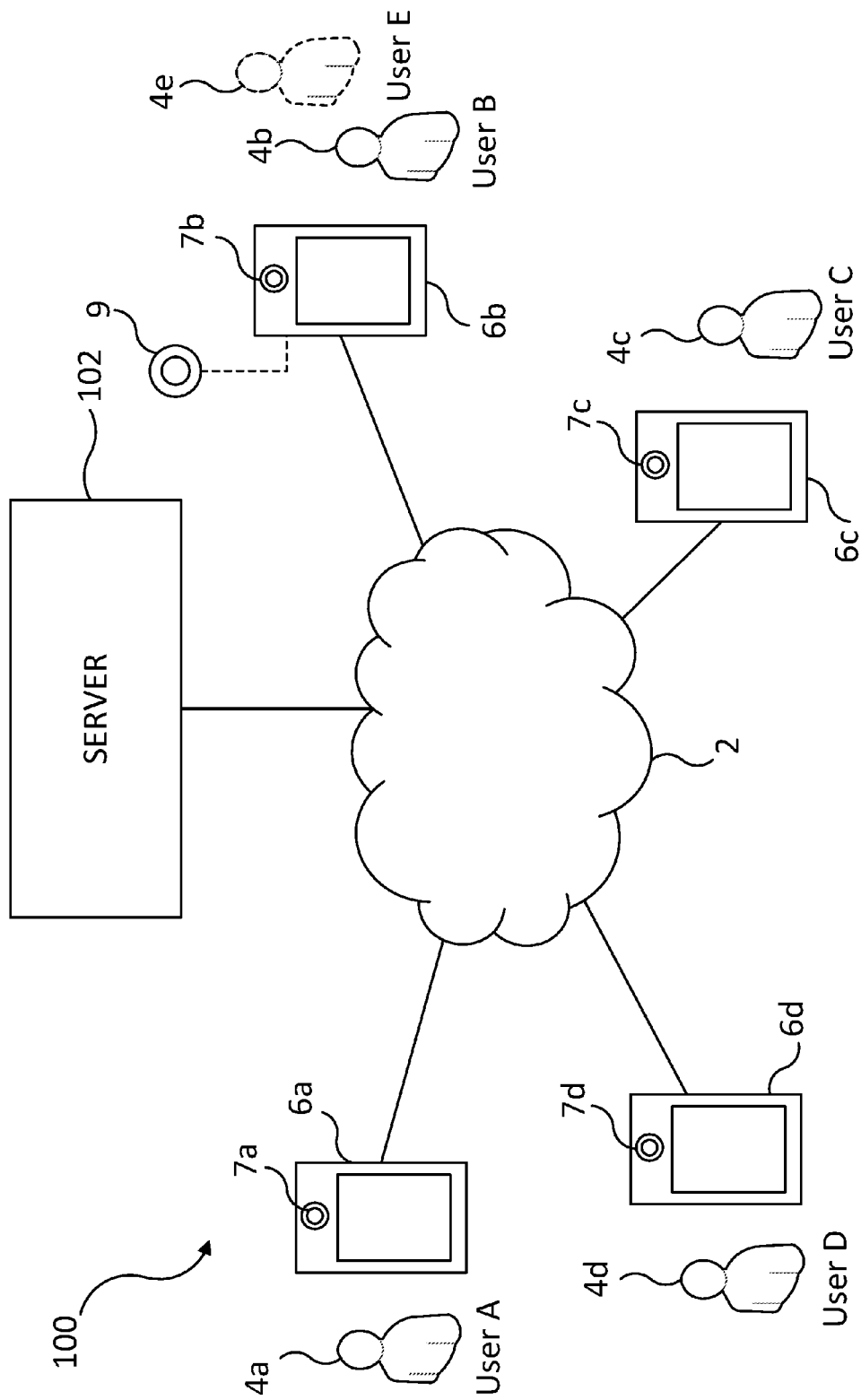
FIG. 1 shows a schematic block diagram of a communication system.

In a video conference conducted via a communication network, it may not always be desirable to display all of the video images of the other users in the videoconference, to a particular user. This may be the case, for example, where only a few of the users are active—i.e. doing something that may be of interest to one or more of the other users in the videoconference and/or if there is a very large number of users on the call. For example, only one or two of the users may be speaking users. It may be desirable to prevent the video images associated with the remaining users, i.e. the inactive users, from being displayed at a user's terminal. This ensures that the user terminal does not allocate display resources to video data that does not add to the user's experience of the video conference. This is particularly, though not exclusively applicable, to mobile, tablet or certain laptop devices within limited available display areas. It may also in some cases ensure that network-bandwidth is not allocated to transmitting the video streams associated with the inactive users to other user terminals unnecessarily, as discussed in further detail below.

This is referred to herein as "follow the action storytelling", and guides the consuming participants with the group activity and group response as the communication event proceeds. Currently, with active speaking video conferences, the consuming participants may need to monitor multiple video feeds at once to determine where non-verbal activity is occurring. Alternatively, if they are only viewing active speaker they may not be aware of non-verbal changes in the group activity due to the absence of any suitable visual representation being presented to them.

It may not always be desirable to only display video images of users that are identified as speaking (i.e. displaying video images based exclusively on the detection of verbal events). For example, a user may be interested in a non-verbal event associated with one or more of the other users. This may include an event such as a detected change in the number of users that are present in the video image received from a particular user terminal. It may be desirable to display this kind of event to a user, in addition to, or in place of, the video images associated with verbal-events. In doing so, a user may be able to view the activity of the other users in the video conference (be it verbal or non-verbal) in a story-like manner. It may be desirable to display non-verbal events for a limited time interval; for example, to ensure that a user's focus is not taken away from a speaking user for too long.

Furthermore, given that a non-verbal event can be conveyed visually, i.e. without the need to play out any associated audio data, it may not be desirable to replace both the audio and video data associated with a speaking user, with the audio and video data associated with the video image in which the non-verbal event was detected. For example, it may be desirable to ensure that a speaking user's speech is still played out at a user's user terminal, even if the video image that is being displayed at that user's user terminal, does not correspond to the video image of the speaking user (e.g. if the video image corresponds to the video image in which a change in the number of users was detected). Treating the audio and video data in this way ensures story continuity of the group experience—i.e. that a user's focus is brought to the relevant audio and video data, at the right time in the video conference.

The present disclosure addresses these issues by providing a communication system that causes one or more video images of a video conference to be displayed at a user terminal in a virtual "Storied Experience View". The virtual "Storied Experience View" harnesses the power of video and storytelling to transform a meeting experience (i.e. video conference) beyond active speaking via a more engaging and life-like meet up experience.

The Storied Experience View may comprise a single streaming video grid or a multi-streaming video grid where multiple videos and or audio channels play at one time. By displaying video images in the Storied Experience View, users are able to consume the most engaging and telling story of group activity, i.e. without having to monitor all of the video images of all of the other users in the video conference, in order to determine where non-verbal user activity is occurring. In the Storied Experience View, video may be displayed or sequenced due to the current action at hand using a combination of multiple video grids and single video grids depending on the size of the group activity and the number of sensors capturing the event.

In the present disclosure, one computer receives all of the video streams from each of the respective users, via the network so that an intelligent decision about which to display can be made taking into account all of their visual content. The computer has visibility of all of the candidate streams and is able to limit the number of these that are selected for display at a particular user terminal, taking into account non-verbal events i.e. changes in the visual content of the moving images carried by the streams. Because the computer receives all of the video streams via the network, it is best placed to make intelligent decisions about which video streams to select. Limiting the number of video streams in this way is useful, where, for example, a user terminal has a limited display area. In such a case, it may not be meaningful to display all of the video images of the other users in the video conference, at that user terminal (particularly if the video conference has a large number of participants). The computer receiving the streams is able to work within the confines of the limited display area whilst maximizing the information that is delivered to the consuming user.

This is particularly, though not exclusively, the case where at least two of the video streams are received from different clients running on different client devices as each individual client is not necessarily aware of the visual content of the other client's video stream(s).

In the described embodiments, the computer is embodied in a central server. This allows bandwidth to be saved, as the only the stream(s) selected for displaying to any given client need to be transmitted to that client from the server. In this way, the server is able to use bandwidth efficiently, whilst maximising the amount of useful and/or engaging information that is conveyed to a consuming user.

In embodiments of the present disclosure, detection of a change in the number of people at a specific remote location video stream is, for example, used to trigger a wide framing story sequence priority in the consuming video story experience, thereby providing a live, visual awareness of the enter/leave activity of the people at the remote location to the consuming attendees as it changes by displaying a previously non-displayed video image having a wide view, e.g. of a conference room in which multiple users are located, when one or more of those users leaves and/or when one or more new user's join them. That is, in addition to displaying previously non-displayed images in response to detecting enter/leave events in them, images may, in some embodiments of the present subject matter, be selectively cropped before displaying them in dependence on such events. The detection is performed on the uncropped image, to ensure that changes in the visual content that may have been cropped out are still detected. For example, when an enter/leave event is detected in a video image that is not being displayed, that may cause the image to be displayed in a wide view (i.e. with no or minimal cropping) to ensure that the event is visible. This also applies to an enter/leave event detected in a video that is currently being displayed. For example, if the active consumed video is cropped to an active speaker in the total video view (medium or close up of head and shoulders) a change in the number of users via face, audio, movement, may be detected in the uncropped version of that video image. In response, the video is un-cropped to the widest viewable view so users can see the change in the number of people in the room (plus or minus).

That is, when a given video view is streamed from a location and the number of people detected present in that captured space has escalated or decreased, this allows the consuming participant(s) story view to switch priority to the widest camera input view available for a specified duration (in addition to changing which streams are displayed, where necessary). For example, switching from a medium or close-up cropped video view, to a reframed or un-cropped wide view. Thus informing the consuming meet participants visual awareness of the enter/leave change that occurred in the number of people currently present in the remote location. This priority wide video view behaviour can be consumed by a single or multi-split view grid in the virtual story stage environment.

Accordingly, in such embodiments, the system ensures that users are made aware not only of enter/leave events (or other changes in the visual content) of video images that are not being displayed, but also in any video image(s) that are currently being displayed.

The present disclosure allows virtual attendees during virtual meet ups (e.g. video conferences) to track participant enter/leave activity and awareness during the story video view experience.

Note that references to users "entering" or "leaving" in the present context do not refer to new network endpoints connecting to or disconnecting from a call. Rather, they refer to changes in the visual content of a moving image carried by a video stream that is generated by a given endpoint (e.g. a general purpose computer, or dedicated video-conferencing hardware). That is, references to leaving refer to a user who was previously detectable in a moving image becoming undetectable therein (e.g. because he has walked out of a real-wold conference room, or at least out of view of a camera in the conference room), whereas references to joining refers to a user newly becoming visible in the moving image (e.g. because he has walked into the conference room, or at least walked into view of the camera). Accordingly, references to displaying a previously non-displayed video image in response to detecting a user entering or leaving mean that the moving image is displayed in response to a change in the visual content of the moving image such that the total number of users that are detectable in that image changes (as opposed to changing which video images are displayed based on existing endpoint disconnecting from or new endpoints connecting to a call).

The enter/leave in video detection can be triggered by various sensor types, face detection, in video frame or in physical space movement detection, and additionally in feed audio or in physical space audio detection depending on the sensors used in some embodiments. Generally, in such embodiments, one or multiple additional sensors may be utilized depending on what data is available, in addition to the visual content of the images themselves. Moreover, other events may also be taken into account in addition to changes in the visual content, such as the detection of a user checking into a meeting room space via another device (mobile, laptop . . . ) thus notifying the group they are now present in that physical space. The "wide room video view" from that space can be escalated into the story view for group awareness.

In the present disclosure, a duration timer is assigned to non-verbal singular events. Upon detection of a non-verbal event the video is promoted and assigned a duration and priority in the active video stack of the live story view sequence during a video call, providing activity awareness of the group non-verbal communication to the remote consuming attendees video sequence for playback.

The present disclosure allows virtual attendees during live playback of video based meet up experiences to track participant non-verbal communication activity and awareness during the story video view experience on the stage. A duration is assigned to the non-verbal communication priority item for story view experiences, resulting in a right place and right time for the activity to surface in the story view. This increases participant engagement, activity and spatial awareness of the users, and the people attendance scale of a meet up.

In addition to live video in video calls, the present techniques may also be applied to recorded video of such calls at a later time.

Herein, references to users being currently "visible" in a moving image (or similar) carried by a video stream does not necessarily mean that the video image is currently being viewed. A user can be visible in a moving image that is not currently being displayed, in the sense that they are detectable in the visual content of that image based on computer-implemented image processing applied to the moving image, such as facial or skeleton tracking applied to the image by a computer. The visual content of a moving image means information that is conveyed by pixel values of the moving image, and which would thus be conveyed to a viewer were that moving image to be displayed (i.e. played out) to him. Thus, in accordance with the present techniques, it is ultimately changes in those pixel values—and in particular a change in the information that is conveyed by the changing pixel values—that causes certain video images to be selected for displaying for appropriately chosen intervals to convey the information change to one or more call participants. Each such change in the information conveyed by the visual content of a moving image is referred to individually herein as a "non-verbal singular event", which includes for example changes in the number of users in the moving image and certain expected (i.e. recognizable) movements by a user in the moving image.

A moving image is also referred to herein as a "video image", and means a sequence of frames (i.e. static images) to be played out in quick succession to give the impression of movement. Unless otherwise indicated, any references to "an image" below denote a moving image in this sense, rather than a static image. References to "displaying a video stream" mean displaying the moving image carried by that video stream.

FIG. 1 shows a communication system 100 comprising a first user 4a (User A) who is associated with a first user terminal 6a, a second user 4b (User B) who is associated with a second user terminal 6b, a third user 4c (User C) associated with a third user terminal 6c and a fourth user 4d (User D) associated with a fourth user terminal 6d. Each of the respective users participating in the video conference may be at different remote locations. A fifth user 4e (User E) is shown as a user that may not always be present at the location associated with User B (or at least, may not always be in view of the camera device 7b). Whilst only five users have been shown in FIG. 1, it will be appreciated that the communication system 100 may comprise any number of users and associated user devices. It will also be appreciated that, whilst each user terminal 6 is shown with an associated camera device, 7, one or more of the user terminals may be associated with one or more additional cameras or sensors (e.g. microphone array, Kinect etc.), thereby allowing more streams of input from that location. For example, user terminal 6b is shown to have an additional camera device 9. The additional camera device 9 may provide an alternative angle from which to capture a video image of user 4b (and/or user 4e). The multiple camera devices and/or sensors can be identified as co-located and sourced for the best positioned sensor input in the storied experience.

More generally, one or more peripheral devices, such as external cameras, audio mics, motion sensors etc. may be connected to the network. These can be checked in or added to a specific parent device location via Bluetooth, WiFi, network login etc. These peripheral devices may act as added sensors or user preference inputs. Sensor coverage (i.e. the time at which particular sensors are activated) may be constrained so as to cover a storied event at the right place and time. For example, a standard type of stored experience may include "chapters" or "phases"; phases such as "start", "story", "end", "manage" and "relive". These chapters or phases may be used to manage the priorities and coverage of behaviour so as to ensure that such behaviour is captured at the appropriate times.

The user terminals 6a, 6b, 6c and 6d can communicate over the network 2 in the communication system 100, thereby allowing the users 4a, 4b, 4c and 4d to communicate with each other over the network 2. The network 2 may be any suitable network that has the ability to provide a communication channel between user terminals 6a, 6b, 6c and 6d. For example, the network 2 may be the Internet or another type of network such as a High data rate mobile network, such as a 3rd generation ("3G") mobile network.

The user terminals 6a, 6b, 6c and 6d can be any type of user device such as, for example, a mobile phone, a personal digital assistant ("PDA"), a personal computer ("PC") (including, for example, Windows™, Mac OS™ and Linux™ PCs), a gaming device (Xbox), a group room meeting device (e.g. Surface Hub) or other embedded device able to connect to the network 106. Each user terminal is arranged to receive information from and output information to one or more of the other user terminals. In one embodiment, each user terminal comprises a display such as a screen and an input device such as a keypad, a touch-screen, camera device and/or a microphone.

User terminals 6a, 6b, 6c and 6d each execute a communication client application provided by a software provider associated with the communication system. The communication client application is a software program executed on a local processor in the respective user terminal. The communication client application performs the processing required at the respective user terminal in order for each user terminal to transmit and receive video data (carried in the form of video streams) over the network 2. Each user terminal is connected to the network 2.

The communication client application is a video-conferencing application that enables users 4a, 4b, 4c and 4d to participate in a video conference. The communication client application provides a means through which each user can share any video data captured at their user device (e.g. by an associated camera device, such as those shown at 7a, 7b, 7c, 7d and 9 of FIG. 1) with one or more of the other users. The communication client application also provides a means through which each user can receive, at their respective user terminal, the video data captured by the other participants of the video conference.

For example, a user, such as user A, may initiate the video conference by transmitting a request to one or more other users, such as users B, C and D. Upon accepting the request from user A, users B, C and D may each receive video data from user A, and transmit their own video data to each of the other users that have agreed to partake in the video conference. For example, user B may receive the video data captured by one or more of users A, C and D.

Groups of people (i.e. users) may also be detected and identified at a single location or via single or multiple devices. This is important for improving group awareness and coverage from a single location into the virtual storied experience. This also ensures that all of the distributed people (users) and groups of people (users) are fully engaged and aware of everyone's presence.

Connected to the network 2 is a control server 102 arranged to receive video streams from one or more user terminals (e.g. user terminals 6a, 6b and 6c) and to determine one or more other user terminals (e.g. user terminal 6d) to transmit one or more of the received video streams to. The control server 102 may be implemented on a single computing device. The control server 102 may also operate to support performance of the relevant operations in a "cloud computing" environment whereby at least some of the operations may be performed by a plurality of computing devices.

User terminals 6a, 6b and 6c may correspond to user terminal 6d (which, in the following examples, is described as a "receiving terminal"). The user terminal 6d executes, on a local processor, a communication client which corresponds to the communication client executed at the user terminals 6a, 6b and 6c. The client at the user terminal 6d performs the processing required to allow the user 4d to communicate over the network 2 in the same way that the clients at user terminals 6a, 6b and 6c perform the processing required to allow the users 4a, 4b and 4c to communicate over the network 2. The user terminals 6a, 6b, 6c and 6d are end points in the communication system. FIG. 1 shows only five users (4a, 4b, 4c, 4d and 4e) and four user terminals (6a, 6b, 6c and 6d) for clarity, but many more users and user devices may be included in the communication system 100, and may communicate over the communication system 100 using respective communication clients executed on the respective user devices, as is known in the art.

Figure 2:
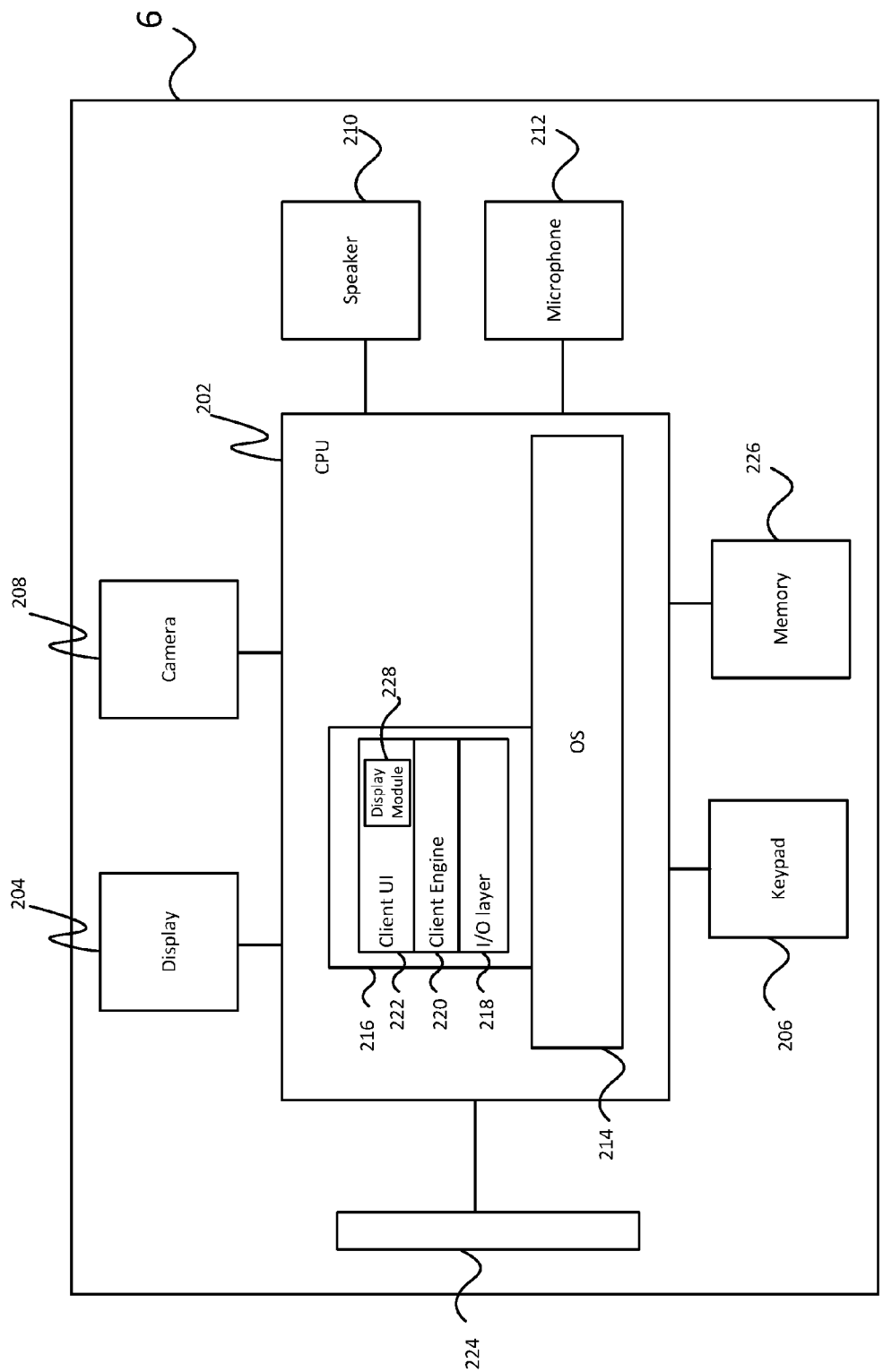
FIG. 2 shows a schematic block diagram of a user device.

FIG. 2 illustrates a detailed view of the user terminal 6 on which is executed a communication client for communicating over the communication system 100. The user terminal 6 comprises a central processing unit ("CPU") 202, to which is connected a display 204 such as a screen or touch screen, input devices such as a keypad 206 and a camera 208. An output audio device 210 (e.g. a speaker) and an input audio device 212 (e.g. a microphone) are connected to the CPU 202. One or more additional sensors (not shown) such as a "Kinect" device or Mixed Reality device such as "Hololens" may also be connected to the CPU 202. The display 204, keypad 206, camera 208, output audio device 210, and input audio device 212 and additional sensors may be integrated into the user terminal 6 as shown in FIG. 2. In alternative user terminals one or more of the display 204, the keypad 206, the camera 208, the output audio device 210, and the input audio device 212 and the additional sensors may not be integrated into the user terminal 6 and may be connected to the CPU 202 via respective interfaces. One example of such an interface is a USB interface. The CPU 202 is connected to a network interface 224 such as a modem for communication with the network 106. The network interface 224 may be integrated into the user terminal 6 as shown in FIG. 2. In alternative user terminals the network interface 224 is not integrated into the user terminal 102. The user terminal 102 also comprises a memory 226 for storing data as is known in the art. The memory 226 may be a permanent memory, such as ROM. The memory 226 may alternatively be a temporary memory, such as RAM.

FIG. 2 also illustrates an operating system ("OS") 214 executed on the CPU 202. Running on top of the OS 214 is a software stack 216 for the communication client application referred to above. The software stack shows an I/O layer 218, a client engine layer 220 and a client user interface layer ("UI") 222. Each layer is responsible for specific functions. Because each layer usually communicates with two other layers, they are regarded as being arranged in a stack as shown in FIG. 2. The operating system 214 manages the hardware resources of the computer and handles data being transmitted to and from the network 2 via the network interface 224. The I/O layer 218 comprises audio and/or video codecs which receive incoming encoded streams and decodes them for output to speaker 210 and/or display 204 as appropriate, and which receive unencoded audio and/or video data from the microphone 212 and/or camera 208 and encodes them for transmission as streams to other end-user terminals of the communication system 100. The client engine layer 220 handles the connection management functions of the VoIP system as discussed above, such as establishing calls or other connections by server-based or P2P address look-up and authentication. The client engine may also be responsible for other secondary functions not discussed herein. The client engine layer 220 also communicates with the client user interface layer 222. The client engine layer 220 may be arranged to control the client user interface layer 222 to present information to the user of the user terminal 200 via the user interface of the client which is displayed on the display 204 and to receive information from the user the user terminal 200 via the user interface.

A display module 228 of the UI layer 222 is shown. The display module 228 determines the manner in which any video streams received over the network (via the network interface) are displayed at the display of the user terminal 6. For example, the display module may receive layout parameters from the network interface, and use these to generate, or select, a particular layout for displaying the one or more video streams.

The display module may also receive data relating to the video streams themselves, such as, for example an associated priority value. The display module may use the priority value associated with a video stream to determine the duration for which that video stream shall be displayed at the user terminal 6 and/or where, within a predetermined layout, the video stream will be displayed.

Figure 3:
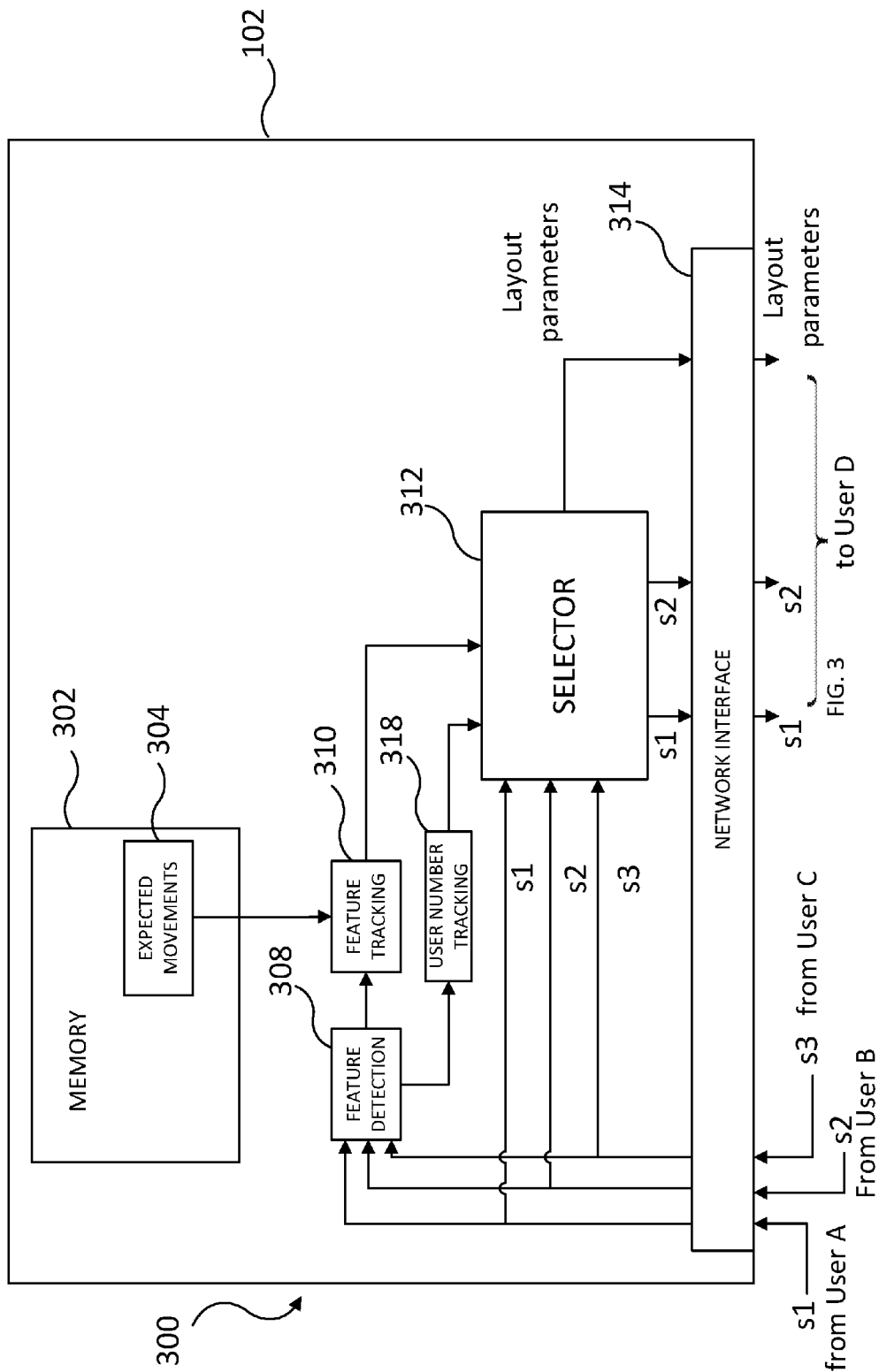
FIG. 3 shows a functional block diagram of a server.

FIG. 3 illustrates a more detailed view of the control server 102 shown in FIG. 1.

As can be seen in FIG. 3, the control server comprises a network interface 314 for receiving and transmitting video streams from and to other user terminals, over the communications network 2.

FIG. 3 corresponds to the control server of FIG. 1, where users A, B, C and D are participants of a video conference.

For the sake of conciseness, the control server shown in FIG. 3 is described from the perspective of determining which of the users, users A, B, C and E, to display to a receiving user, User D. While stream s4 (the stream associated with user D) is not shown as an input to the control server, it will be appreciated that stream s4 may also be an input to the control server, and the control server may determine for each individual user (i.e. users A, B, C and D), which of the other users (and their associated video streams) to display to that user.

In the example shown in FIG. 3, video streams s1, s2 and s3 are received at the network interface from user terminals 6a, 6b and 6c respectively (each carrying a moving image of users A, B and C respectively). As a result of the operations performed by selector 312 (described later), streams s1 and s2 are selected and transmitted, via the network interface, to User D's user terminal 6d, herein referred to more generally as the "receiving terminal".

It should be noted that in alternative embodiments, two or more of the video streams may be received from a single camera device (i.e. there is not necessarily a one-to-one mapping between camera devices and video streams). In such a case, the video streams may be treated by the selector in the same way as if they had been received from separate devices.

In the embodiment described in relation to FIG. 3, at least two of the video streams are received at the control server from different instances of the communication client application, running on different user devices. That is, at least two of the video streams are received from different network endpoints having different network addresses (e.g. different IP addresses, or at least different transport addresses). For example, each of the video streams may be received from a different user terminal, where each of the different user terminals execute an instance of the communication client application (as is the case with streams s1, s2 and s3 shown in FIG. 3). For example, different users may be logged into each of the communication client applications using a username that is different to another user that has logged into another instance of the communication client application. In any case, the at least two of the video streams received at the control server are received from different instances of the communication client application, and not, for example, from different but co-located camera devices (i.e. all in a conference room), which may be connected to the network via a single instance of the communication client application.

In other cases, some of the streams may be received at the server from the same client. That is, a client may transmit more than one stream to the server allowing the server to select between different streams from the same client in the same manner.

For example, a single camera may stream multiple streams derived from a locally-captured "master" video image. For example, each stream may carry video image corresponding to a respective part of the master image (e.g. of different regions, different cropping's etc.).

As another example, multiple camera feeds may be streamed via the network from one location to a shared virtual stage experience. If the number of people detected as present in that single space has escalated or decreased, the story view priority may be switched and the widest camera view and framing available from the total number of active video input sensors may be selected. This provides ideal visual awareness of the total number people currently present in that specific remote location. This priority wide video view behaviour can be consumed by a single or multi-split view grid in the virtual story stage environment.

The network interface 314 is connected to a feature detection module 308, which may for example comprise a skeletal tracking module 308 and/or a facial detection module (not shown separately). The skeletal tracking module is configured to identify the skeletons of one or more users in one or more of the video streams received at the network interface. The skeletal tracking module may use the same process for identifying skeletons as Microsoft's Kinect sensor. The facial detection module is configured to detect the face(s) of any users in each video stream. In the example shown in FIG. 3, the feature detection module 308 receives video streams s1, s2 and s3, and determines whether any users (or rather, skeletons) are present in the respective video streams.

Having identified that one of the video streams is carrying an image of one or more users, the feature detection module 308 may forward information about the user(s) in the corresponding video stream to a user-number tracking module 318.

The user-number tracking module 318 is configured to receive this information and to detect any changes in the number of users that are detected in the respective moving images of the one or more video streams. For the sake of clarity, the following embodiments are described in the context of the user-number tracking module detecting a change in the number of users that are detected in a single video stream, e.g. video stream s2.

The user-number tracking module 318 may detect a change in the number users by detecting a change in the number of faces detected in the moving image of a video stream. For example, the facial tracking module may be configured to detect a number of face-shaped objects that are present in the moving image of the video stream and the user-number tracking module may be configured to determine when this number changes, or when it is likely that this number will change. For example, the user-number tracking module 318 may be configured to detect changes in the movement of a user's face, and to detect when this movement indicates that a user is preparing to leave the location associated with their user terminal (or at least, the location that is detected by the camera device associated with that user terminal). Thus, a receiving user is able to view the user as they leave, rather than being presented with a video stream that, for reasons unknown to them, contains fewer users.

It is valuable during real-time events to keep live activity as a priority. The replay of past activity should be limited to a duration timer that starts at the real start of the event. Thus ensuring that during sync events the story doesn't create a delayed abstraction of reality that would disrupt the continuity of the group experience.

In this respect, note that the term "detecting a change in the total number of users in a moving image" encompasses a pre-emptive detection, i.e. the detection of one or more events (such as a user standing up) that indicate a change in the total number of users is likely to occur imminently.

In some embodiments, the user-number tracking module 318 may be limited to detecting a change in a number of known (i.e. recognised) faces. For example, the facial tracking module may be configured to determine whether the faces identified in the received video stream correspond to one or more known users. This may be performed, for example, by identifying one or more facial features of the one or more detected users, and comparing these with the facial features of known users, stored e.g. in a database in memory at the control server (not shown). The user-number tracking module may then be used to determine whether any changes in the number of detected faces correspond to an increase or decrease in the number of known faces. This embodiment may be useful for determining when a person of importance is no longer present at a user terminal that is participating in the video conference (which in turn, may affect a priority value associated with the corresponding video stream).

In an alternative embodiment, the user-number tracking module 318 may detect a change in the number users by detecting a change in the number of skeletons detected in the moving image of a video stream. For example, as the skeletal tracking module of the feature detection module may be configured to detect the number of skeletons that are present in the moving image of the video stream and the user-number tracking module may be configured to determine when this number changes, or when it is likely that this number will change. For example, the user-number tracking module 318 may be configured to determine when the movement of a user's skeleton is suggestive that the user is about to leave the location associated with their user terminal (or at least the location that is captured by the associated camera device).

In a further, alternative embodiment, the user-number tracking module 318 may detect a change in the number of moving users in three dimensions at a particular location (associated with a user terminal), based on a combination of full body 3d motion capture, facial detection and voice recognition. For example, the user-number tracking module may be configured to receive data from a camera, one or more depth sensors and a multi-array microphone 212 associated with one of the user terminals transmitting a video stream to the control server. The user-number tracking module may then determine whether any changes in this data corresponds to a change, or potential change, in the number of users that are present at the location associated with the user terminal transmitting the video stream to the control server.

If the user-number tracking module detects that there has been a change in the number of users detected in the moving image of a video stream, the user-number tracking module may provide an indication that a change in the number of users has been detected (herein referred to as the user-count indicator), to a selector 312. The user-count indicator may provide an indication of the change in the number of the users that has been detected—e.g. a numerical value indicating the number of users that have entered or left the video image of a particular video stream.

Selector 312 is configured to receive each of the plurality of video streams received at the network interface 314, and to determine which of these to cause to be displayed at one or more user terminals. In the example of FIG. 3, selector 312 is configured to determine which of the video streams s1, s2 and s3 to cause to be displayed as User D's user terminal (i.e. the receiving terminal).

Selector 312 is also configured to receive the user-count indicator from the user-number tracking module. The user-count indicator enables the selector 312 to determine which of the plurality of received video streams to select and cause to be displayed at a particular user's user terminal (in this example, user D's user terminal 6d).

The user-count indicator also enables the selector 312 to determine a time interval for which the one or more video streams associated with a detected change in the number of detected users should be displayed at a particular receiving terminal (again, in this example, user D's user terminal 6d).

For example, the selector 312 may use the user-count indicator to query the entries of a database, where each possible change in the number of detected users is mapped to a predetermined time interval. The entries of such a database are shown in FIG. 4 (discussed later).

Alternatively, the selector 312 may use the user-count indicator to determine a time interval as and when it is needed. That is, the time interval may be a function of the change in the number of detected users, and the selector may compute the time interval based on the user-count indicator. For example, the selector may determine time intervals such that the larger the detected change in the number of users, the longer the time interval for which the associated video stream is to displayed at a receiving terminal.

In some embodiments, a tagged location or device may default to no enter/leave detection (i.e. no detection of a change in the number of detected users), while "focus locations" may allow the detection to occur. This feature may be valuable for a "broadcast or presentation" experience, where, for example, it may be desirable to de-escalate (e.g. assign a lower priority) to the audience enter/leave activity of one or more remote audiences consuming the broadcast or presentation. The presenting user's point view may have a different enter/leave activity priority than the audience's, such that the presenting user has more awareness of the enter/leave activity of the one or more remote audiences, whilst each remote audience has less awareness of the enter/leave activity of the other remote audiences. A user may tag a device or particular location as having either no enter/leave detection or being a "focus location" by configuring their user settings in the "settings" menu of the communication client application.

In further embodiments, the control server (e.g. the user-number tracking module 318) may tag the entry and exit of users for post-production or curation of the event. For example, a participant may wish to re-visit the activity or meeting post the real time event. The enter/leave activity can be used to understand who was involved in specific activities at specific times. In certain embodiments, the coverage of join/leave activity of users may be limited, where for example, a change in the number of detected users is detected multiple times in a short amount of time (herein referred to as "mass" activity). For a video stream that corresponds to such activity, the selector may select a default "mass join, mass leave or mass join/leave" time interval for displaying the video stream. This may allow the video stream to be displayed persistently—i.e. for longer than the time interval associated with the first detected change in the number of users. Alternatively, in response to detecting "mass" activity the selector may cause the associated video stream to not be displayed at a receiving terminal. Whether the video stream is displayed or hidden may depend on the type of meeting that the participants of the video conference are partaking in e.g. presentation/speaker or collaboration.

During the detection of mass visual activity in frame, timers may be used to extent or hold the detection duration until the activity calms. This keeps the video switching from becoming too active and holds the user's attention on the action. This is similar to participant mass activity detection, where, on detection of mass activity, activity is grouped into one transition instead of a sequence of transitions to support a fluid and natural stored sequence of views and video.

The selector 312 may also use the user-count indicator to determine a priority associated with a video stream in which a change in the number of detected users was detected. For example, video streams in which a change in the number of detected users is detected may be deemed more worthy of display than others. For example, video streams associated with non-speaking or relatively stationary users may be associated with a lower priority value than video streams for which a change in the number of associated users has been detected. The priority value may be reset to a new value once the determined time interval (described above) has elapsed.

In a situation where changes in the number of detected users is detected in multiple video streams, but only a limited number of video streams can be displayed at a particular receiving terminal, the selector 312 may use the priority value associated with each of the video streams to determine which of the video streams to select for display at the receiving terminal. Video streams in which a larger change in the number of detected users has been detected may be assigned a higher priority value than video streams in which a smaller change in the number of detected users was detected. This may ensure that video streams associated with small but regular changes in the number of detected users are not displayed in favour of other video streams, where more dramatic changes in the number of detected users may be occurring.

A user defined priority view may also influence the sensor priority order. For example when an installer is setting up a room the admin may assign a front of room camera as the dominant view for that space, allowing all other device sensors that are or get detected as alternate view option for the story view. An alternate view could be escalated to priority view when the added or reduced user detection is defined as the more coverage view.

The priority value may also determine the manner in which a selected video stream is displayed relative to any other video streams which have also been selected for display at the receiving terminal (i.e. relative position and size).

The selector 312 may have stored in memory, a selection of grid layouts, and the selector 312 may select a particular grid layout for displaying the one or more selected video streams. The grid selected by the selector 312 may depend on the number of video streams that the selector 312 has selected for display at a particular user terminal.

Story continuity will put a priority on assignment to one story grid area for a specific location during a meetup, allowing wide view priority to replace the current view from that location if it is present in the grid, as opposed to populating another grid as a default. This also influences continuity as common location feeds can be focused into a single storied frame view when sequenced in the stage grids for consuming participants (that is, the video streams associated with the same user location can be displayed at the same, or a similar location in the grid, even if the grid itself is updated). During a room to room shared experience or a room to audience broadcast multi cameras views distributed across a multi-frame grid makes more sense to consume as the consuming participants associate all the views from a single location.

Figure 9:
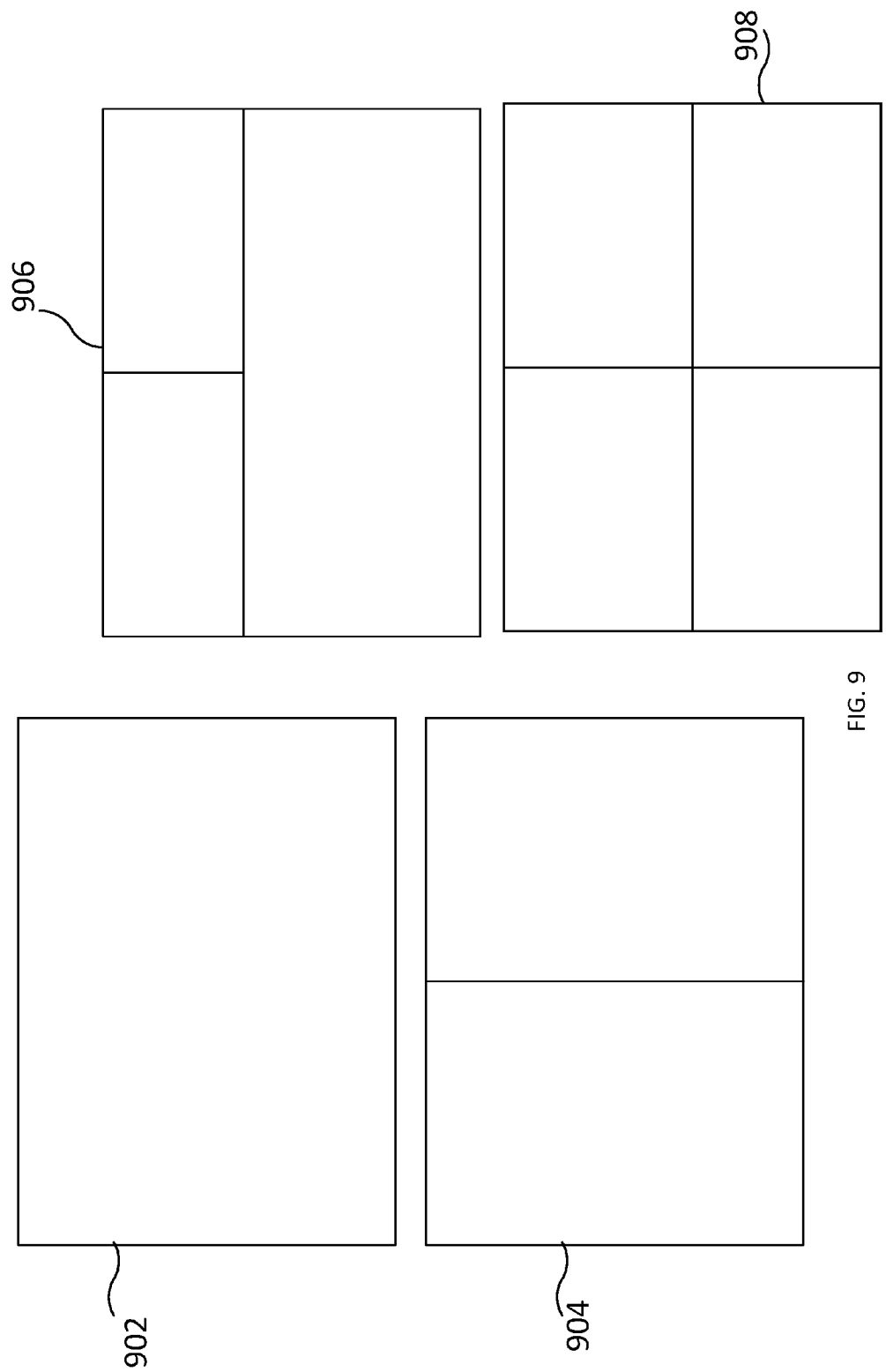
FIG. 9 schematically illustrates selectable predetermined layouts.

The selector 312 may also use the priority associated with a selected video stream (based e.g. on the detected change in the number of detected users) to determine where, within the selected grid layout, that video stream is to be displayed. Some examples of possible grid layouts are shown in FIG. 9. For example, grid layout 902 may be used to display a single video stream, grid layout 904 may be used to display two video streams simultaneously, grid layout 906 may be used to display three video streams simultaneously, and grid layout 908 to display four video streams simultaneously. Whilst only four grid layouts are shown in FIG. 9, it will be appreciated that a grid layout may be selected so as to display any number of video streams. For example, a grid layout comprising five or more units may be selected to display four selected video streams. Whilst the grid layouts shown in FIG. 9 are all shown with rectangular units, the units of each grid may be of any shape and are not constrained so as to all be of the same shape.

For greater story continuity and fluid transitions between the different video streams that are displayed at the receiving terminal, the selector may be configured to ensure that there is a limited duration of time in which the units of the selected grid layout can be updated (i.e. a new video stream can be selected for display, at that unit of the grid).

For example, in one embodiment, the selector may ensure that only one unit of the selected grid is changed at a time—i.e. no new video streams are displayed at any of the other units of the grid, during the second time interval.

Alternatively, in a second embodiment, the selector may ensure that there is limited duration of time in which multiple units of the selected grid layout can be updated (i.e. to display the video streams in which a change in the number of users was detected). For example, following e.g. the selection of a first video stream, the selector may only allow other units of the selected grid to be updated, if these can be updated before the limited duration of time elapses.

These embodiments ensure that the least amount of video grid view updates occur within a designated duration of time, thereby making it as easy as possible for users to follow user activity within the "Storied Experienced View".

An allowance for a delayed playback of an enter/leave event may be utilized to communicate the clearest story experience. In this case, if a person walking out of a room is captured on video, the delayed playback could show the actual exit footage playback followed by the real-time empty room, thereby giving the greatest intuitive perception of events to the remote participants.

The selected grid and positioning of each of selected video streams within the grid may be indicated to the receiving user terminal (e.g. terminal 6d) in the form of layout parameters, as shown in FIG. 3. The receiving user terminal may interpret the layout parameters so as to display each of the selected video streams at their respective positions in the selected grid. Three types of time interval (i.e. durations) are described below.

Short Duration:

A set duration attached to a non-verbal event. Short would be set to a specific duration (example: 1.5 seconds). Allowing the priority assigned video to priority stack in the video story for consuming participants but not interrupt the active speaking audio signal. The active speaking audio signal would remain constant. Short will be assigned to participant activity that is added awareness but not essential at an extended activity. Including reaction shots: smiling, head nodding, head shaking, hand waving, hand pointing . . . ).

Medium Duration:

A set duration attached to a non-verbal event. Medium would be set to a specific duration (example: 2.5 seconds). Allowing the priority assigned video to priority stack the video story for consuming participants but not interrupt the active speaking audio signal. The active speaking audio signal would remain constant. Medium is assigned to specific activities deemed important to group activity awareness such as a change of body location in the room. Or a detection of a new body or person in the room (stand, sit, walk enter, leave a location).

Extended Duration:

The set duration for dominant activity participants. This duration is primarily assigned to active speaker. Giving active speaker the dominant story priority unless interrupted by a short duration story view or depreciated due to lack of speaking. An example of this is if story view is in single grid view and is an edge to edge video of active speaker. When a short or medium duration priority video is triggered to replace the active speaker video (but not the active audio) once the limited duration video has timed out it is replaced by the continuous active speaker video view that was populated at this location previously. Alternatively, if a "Mass" activity is detected, where multiple triggers are being detected in a short amount of time (e.g. multiple changes in the number of detected users in a short amount of time), this would extend the priority view to avoid multiple view switches from stacking sequentially. This ensures that a user is not disorientated by the multiple view switches that would otherwise occur each time e.g. a new number of users is detected.

For greater story continuity and fluid people engagement experiences the camera view grid updates are populated as a single or a group in a set duration of time whether it be from a single location or multiple locations. This is to ensure that the video playback is as fluid and noise-free as possible. It is also to ensure the least amount of video grid view updates occur within a designated duration of time, thereby allowing the story experience to be as engaging and easy to follow the action.

Persistent Duration:

The set duration for dominant activity participants. This duration is primarily assigned to a user pinned or view type that does not allow a video view to be interrupted. Thus duration is continuous until the user re-assigns the view or the meeting ends.

Non-verbal communication duration priority metric for: body, arm, hand, gesture, head, face and eye movement detection for story video priority metric. Duration priority metric works in conjunction with a playback durations library: short, medium, priority, and extended specification. As well as story grid location priority designated by a stack ranking of most recent activity, participant association or user preference.

Returning to the example illustrated in FIG. 3, the selector 312 may receive an indication that a change in the number of detected users was detected in streams s1 and s2 and based on this, select streams s1 and s2 for transmission to user 4d's user terminal. The selector 312 may select, for example, grid layout 904, shown in FIG. 9, and forward the corresponding layout parameters to the receiving terminal. In response to receiving the layout parameters, the receiving terminal may then render the two video streams such that the first video stream, s1, is displayed at a first location of the grid (e.g. the left-hand unit of the grid), and the second video stream, s2, is displayed at a second location of the grid (e.g. the right-hand unit of the grid). In some embodiments, it may not be necessary to send of all the layout parameters to the receiving terminal, if for example, there is no change in the number of video streams that are to be displayed at the receiving terminal (as described later in relation to FIGS. 7A and 7B).

Alternatively, the user-count indicator may indicate that a change in the number of detected users was detected in stream s2 only. For example, camera 7b associated with User B's terminal 6b may have detected that another user, User E, has entered or left the location associated with User B's user terminal. Based on this, the selector 312 may determine to increase the number of video streams displayed at user 4d's user terminal 6d, by continuing to transmit stream s1 (which was displayed at user 4d's user terminal 6d, prior to detecting a reaction from User 4B) and also transmitting stream s2 to User D. User D is thus be able to see that there has been a change in the number of users at User B's location, in addition to the video of User A, who may be for example, a speaking user. The control server may transmit layout parameters for grid layout 904, instead of the layout parameters for 902, which were previously used to display User A's video stream (as described later in relation to FIGS. 6A and 6C).

FIG. 4B shows a high-level representation of a database that may be used by the control server to determine a priority associated with a video stream, based on a detected change in the number of users in the moving image of the video stream.

As can be seen in FIG. 4B, a first column 402B of the database may contain entries for each possible change in the number of users detected in the moving image of a video stream. For example, D1 may correspond to the number of detected users changing by +1, D2 may correspond to the number of detected users changing by +2, D3 may correspond to the number of detected users changing by +3, D4 may correspond to the number of detected users changing by +4, D5 may correspond to the number of detected users changing by +5 and so on and so forth. The entries for the change in the number of detected users may also cover negative values, for example, there may be a separate entry for negative changes in the number of detected users (−1, −2, −3, −4, −5 etc.). Alternatively, there may be an entry for each possible change in the number of users, regardless of whether it is a positive or negative change in the number of detected users (e.g. entries for +/−1, +/−2, +/−3, +/−4, +/−5 etc.).

A second column of the database 404B may contain entries for the priorities associated with each possible change in the number of detected users. For example, D1 may have a priority value P1, which is higher or lower in value than the priority value P2 associated with D2. The priority value may be used to determine the manner in which video streams are displayed relative to one another. For example, a video stream associated with a higher priority value (e.g. a greater change in the number of detected users) may be displayed more prominently than a video stream associated with a lower priority value (e.g. a smaller change in the number of detected users). The priority values may be used, for example, to determine which of the units of a grid layout (such as those shown in FIG. 9) a selected video stream occupies.

The priorities may also be used to limit the number of video streams that are selected for display at a receiving terminal—for example, if a change in the number of detected users is detected in multiple video streams but only a limited number of video streams can be displayed (effectively) at a particular receiving terminal, the priority values may be used to determine which of those video streams are selected for display.

It will be appreciated that, whilst an individual priority value is shown for each change in the number of detected users (i.e. D1, D2, D3 etc.), one or more of the detected changes may share the same priority value and be grouped according to this priority value. For example, there may be a single priority value for a change in the detected number of users that is equal to or greater than 5. Alternatively, each change in the number of detected users (i.e. D1, D2, D3 etc.) may be associated with the same priority value (which in turn, may ensure that each change is detected for the same time interval—described below). If, for example, a large number of changes in the number of detected users is detected over a relatively small time period, a priority value may be selected so as to ensure that the video stream associated with those changes is assigned a single priority value (rather than a new value, each time the number of detected users increases or decreases).

A third column of the database 406B may contain entries for the time interval associated with each change in the number of detected users, that is, the time interval for which the video stream associated with that change should be displayed at a receiving terminal. Different changes in the number of detected users may be associated with different time intervals. For example, a greater change in the number of detected users may be associated with a time interval that is greater than a smaller change in the number of detected users. The control server may use the time interval to determine when to stop transmitting the video stream associated with the change in the number of detected users, to a particular receiving terminal.

It will be appreciated that, whilst a separate column is shown for the priority and time interval of each respective change in the number of detected users, these two parameters may in fact be correlated (i.e. derivable from one another).

For example, the priority value associated with a change in the number of detected users may be used to determine the time interval for which the corresponding video stream (or rather, moving image) should be displayed. Higher priority values may result in the determination of longer time intervals. Alternatively, lower priority values may result in the determination of longer time intervals.

Ultimately, any relationship between the priority value and time interval may be used. This relationship may allow time intervals to be determined 'on the fly' for each detected change in the number of detected users. That is, rather than storing a time interval for each of the possible changes in the number of detected users in a database, the database may contain entries for the priority values only, and these may be used to determine the time interval for the change in the number of detected users, as and when that change is detected.

One or more other columns 408B of the database may contain entries pertaining to other parameters. For example, these parameters may relate to the grouping of different changes in the number of detected users.

Figure 5A:
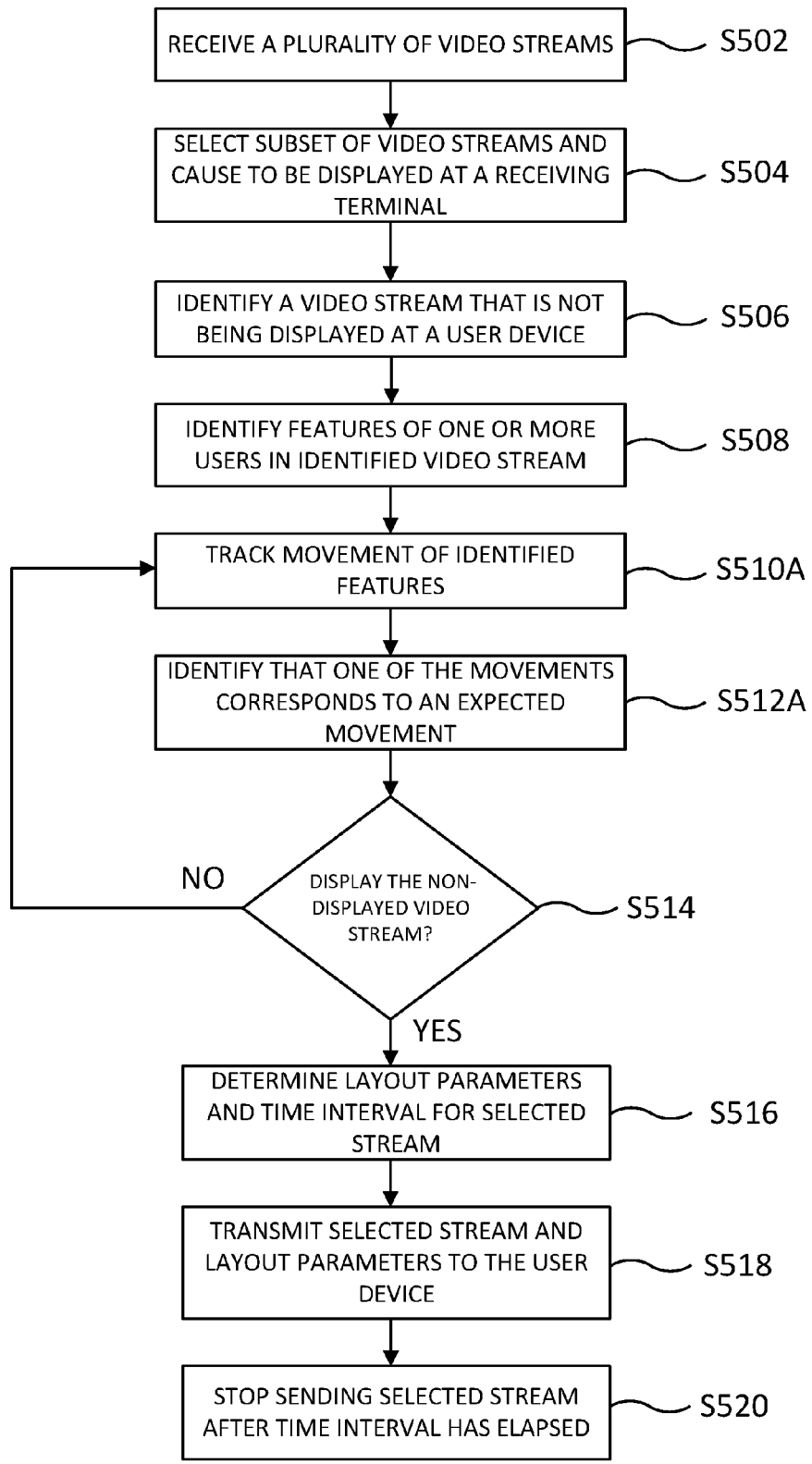
FIG. 5A shows a flow chart for a method of selecting video streams for displaying at a user device during a call, based on the identification of an expected movement in the moving images of the video streams.
Figure 5B:
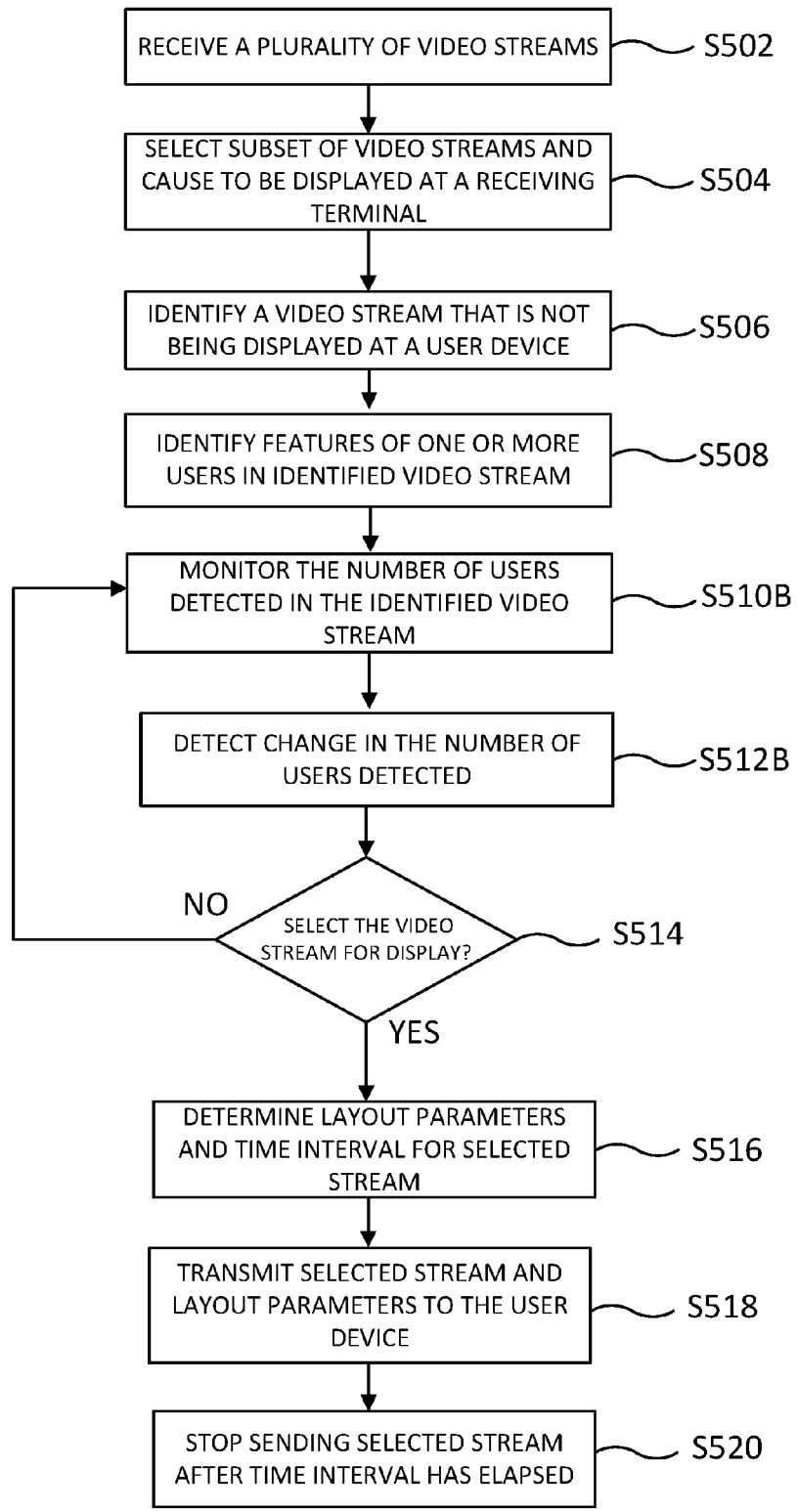
FIG. 5B shows a flow chart for a method of selecting video streams for displaying at a user device during a call, based on a detected change in the number of users in the moving images of the video streams.

FIG. 5B illustrates a flowchart of the method performed at the control server for determining when to select a video stream for display at a receiving terminal (e.g. User D's user terminal), based on a detection that there has been a change in the number of users in the moving image of that video stream It should be noted that, whilst FIG. 5B only shows a method for determining whether to select a single video stream for display at a receiving terminal, the control server may perform multiple instances of the described method, e.g. in parallel, in order to determine whether a plurality of video streams should be selected for display at a receiving terminal.

At step, S502, a plurality of video streams are received at the control server (i.e. at the network interface of the control server). For example, these video streams may be received from the user terminals associated with users A, B and C. Alternatively, two or more of these video streams may be received from a single camera device, associated with two or more of users A, B and C.

At step S504, the control server selects a subset of the received video streams for display at the receiving terminal. The control server causes these video streams to be displayed at the receiving terminal, i.e. by transmitting them, along with any associated layout parameters, to the receiving terminal.

At step S506, the control server identifies a video stream that is not currently being displayed at the receiving terminal (herein referred to as "the identified video stream"). For example, each of the video streams received at the control server may include an indication of whether or not they are currently being displayed at the receiving terminal. The control server may use these indications to identify a video stream that is not currently being displayed at the receiving terminal.

Alternatively, a separate module within the control server (not shown in FIG. 3) may keep track of the video streams that were previously selected for display at the receiving terminal. This information may be used by the control server to identify a video stream that is not currently being displayed at the receiving terminal.

At step S508, the control server identifies one or more features of the one or more users identified within the identified video stream. As noted earlier in relation to FIG. 3, the feature detection module 308 may detect that a user is present in the identified video stream e.g. based on skeletal and/or facial tracking, by applying suitable skeletal and/or facial tracking algorithms to the moving images respectively.

At step S510B, the control server monitors the number of users that are detected in the identified video stream, e.g. based on the number faces or skeletons detected by the feature tracking module.

At step S512B, the control server detects a change in the number of users detected in the identified video stream, e.g. based on a change in the number of detected skeletons or faces detected by the user-number tracking module. As noted earlier, detecting a change in the number of users may include determining that a change in the number of users is likely to occur (e.g. based on the movement of a user's skeleton or face).

At step S514, the control server determines whether to cause the identified video stream to be displayed at the receiving terminal. If the control server determines that the identified video stream should not be displayed at the receiving terminal (indicated by 'NO' in FIG. 5), the control server continues to monitor the number of users detected in the identified video stream.

The control server may, for example, determine a priority value associated with the detected change in the number of detected users and determine whether this value is higher than a priority value determined for a second video stream in which a change in the number of detected users was also detected. If the priority value determined for the first video stream is lower than the priority value determined for the second video stream, the control server may determine that the first video stream (i.e. the identified video stream) should not be displayed at the receiving terminal. If, whilst displaying the video stream in which a change in the number of users was detected, the audio of a new speaking user is detected, the control server may ensure that once the second time interval has elapsed, the video stream associated with the new speaking user is selected for display (and caused to be displayed) at the receiving terminal.

If the control server determines that the identified video stream should be displayed at the receiving terminal (indicated by 'YES' in FIG. 5), the control server selects the video stream for display at the receiving terminal.

At step S516, the control server determines the time interval for which the selected video stream should be displayed and any layout parameters that are needed in order to define the way in which the selected video stream will be displayed at the receiving terminal (e.g. relative to any other video streams that have been selected for display at the receiving terminal).

In one embodiment, the time interval associated with the selected video stream may be derived, for example, from the priority associated with the detected change in the number of detected users. As noted earlier in relation to FIG. 3, each possible change in the number detected users may be associated with a priority, and the priority may determine where, and for how long, the selected video stream is displayed at the receiving terminal.

At step S518, the control server transmits the selected video stream to the receiving terminal, along with any associated layout parameters. As noted earlier, the layout parameters are used by the receiving terminal to determine the manner in which the selected video stream is to be displayed.

At step S520, the control server detects that the time interval associated with the selected video stream has elapsed and stops sending the selected video stream. In response to the time interval elapsing, the control server may transmit new layout data to the receiving terminal, thereby ensuring that screen space is not allocated to video streams that are no longer being transmitted to the receiving terminal, from the control server. FIG. 6A illustrates an example of a moving image of a user, user 604A, that may be displayed at the display of User D's user terminal, during a first time interval, during the video conference.

FIG. 6A illustrates an example display window 602A that may be used to display the moving image of a user 604, to a receiving user, e.g. User D. User 604 may have been determined to be important based e.g. on a recent detection of the user's speech, or the user having initiated the video conference. This user is herein referred to as the "primary user", with an associated "primary video stream". In this particular example, user 604 may correspond to e.g. User A in FIG. 1.

At a separate user terminal, a second user, e.g. User B, may be receiving the primary video stream from User A. The second user may also be capturing their own video data (i.e. of themselves) and transmitting this video data to the control server.

During a first time interval, the control server may determine that there has been a change in the number of users detected at the location associated with a second user's user terminal (e.g. User B). For example, the control server may detect that a third user, User E, has appeared in the moving image received from User B's user terminal (which previously only contained a moving image of User B). In response to detecting this change in the number of users, the control server may select the video stream carrying the image of Users B and E for display at the receiving user's user terminal (the receiving terminal).

Figure 6B:
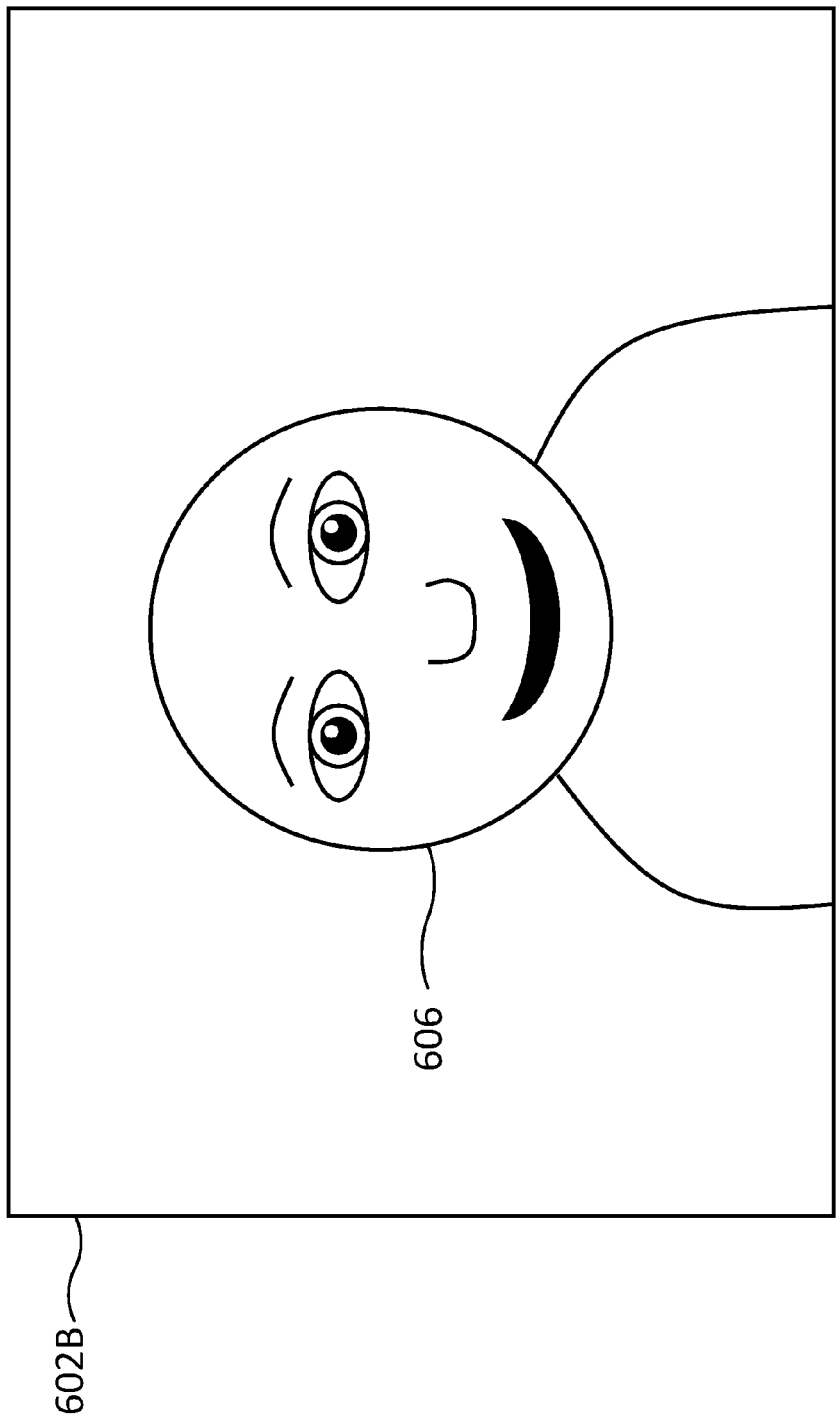
Figure 6C:
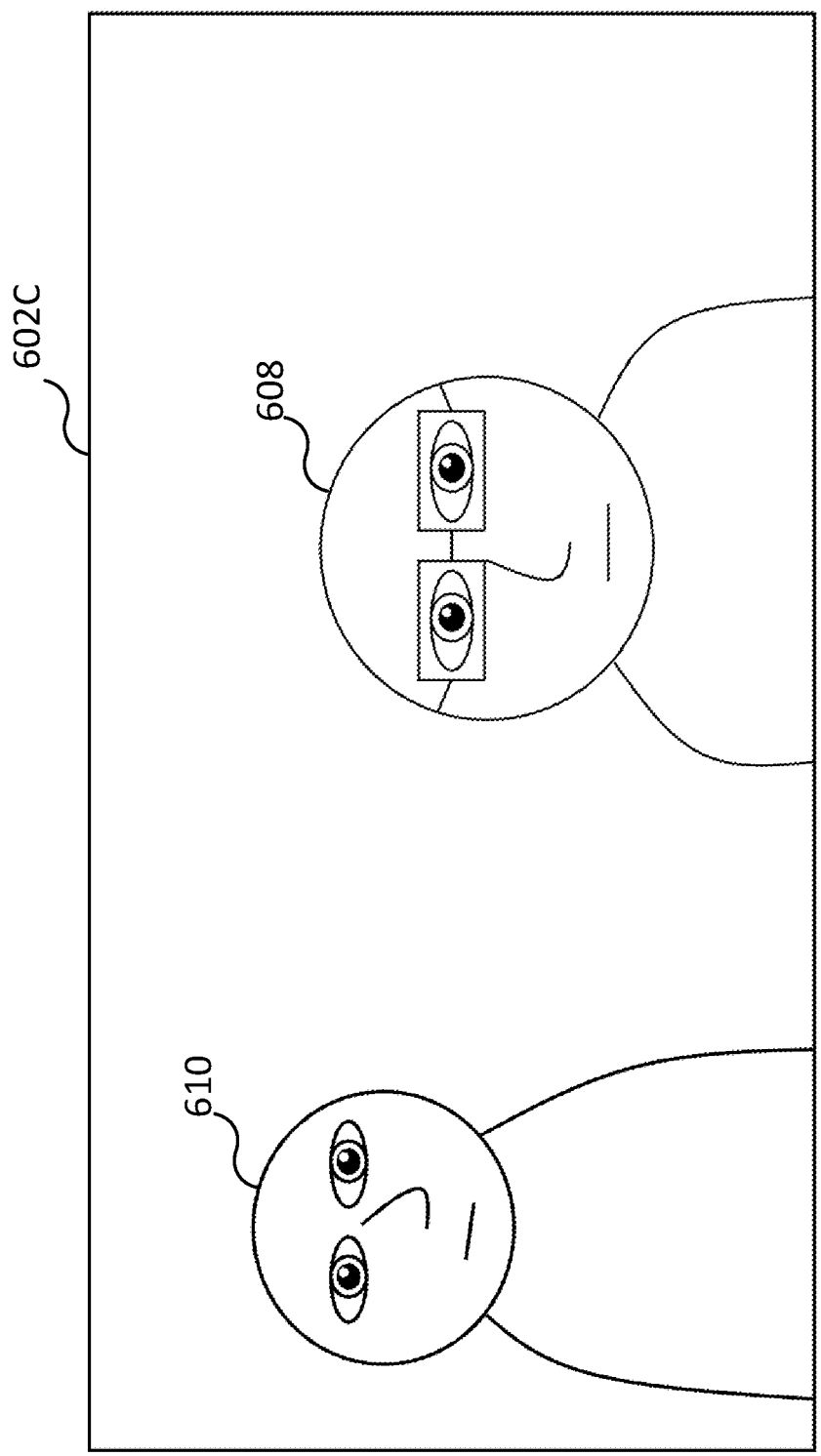

An example embodiment is illustrated in FIG. 6C, where the moving image of primary user 604 (e.g. User A), has been replaced with the moving image of users 610 (e.g. User E) and 608 (e.g. User B). As noted earlier, the moving image of users 608 and 610 is displayed for a predetermined time interval (the second time interval). The control server may ensure that the primary video stream is not transmitted to User D, for the duration of this time interval. In FIG. 6C, the video image of users 608 and 610 is displayed in display window 602C.

The control server may also ensure that any audio (i.e. detected speech) associated with the primary user is still transmitted to User D. That is, the control server may treat the video and audio streams of each user (e.g. users A, B and C) separately, and only determine which of the video streams (and not audio streams) to select for display User D's user terminal. Hence, User D is able to continue to listen to the speech of the primary user, whilst also viewing any changes in the number users at a given user terminal, as and when they occur.

In an alternative embodiment, in response to determining that a third user (e.g. User E) has entered or left the location associated with a second user (e.g. User B), the control server may continue to transmit the primary video stream to User D's user terminal, and also select the video stream associated with the second and third users for transmission to User D's user terminal. This may also include transmitting new layout parameters to User D's user terminal 6d—i.e. layout parameters that ensure that the two video streams are displayed simultaneously using grid layout 904 (FIG. 9).

Figure 6D:
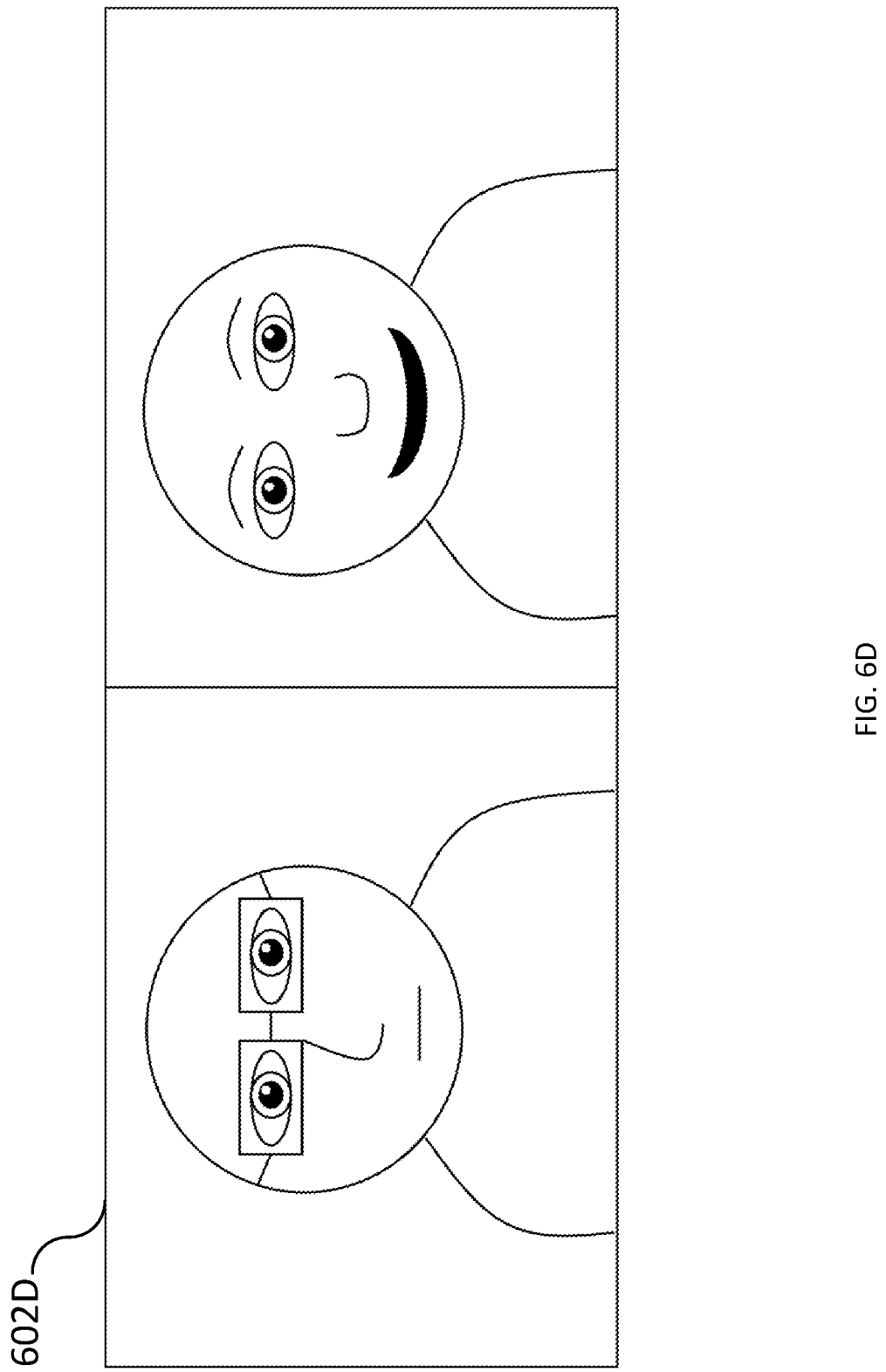
Figure 6E:
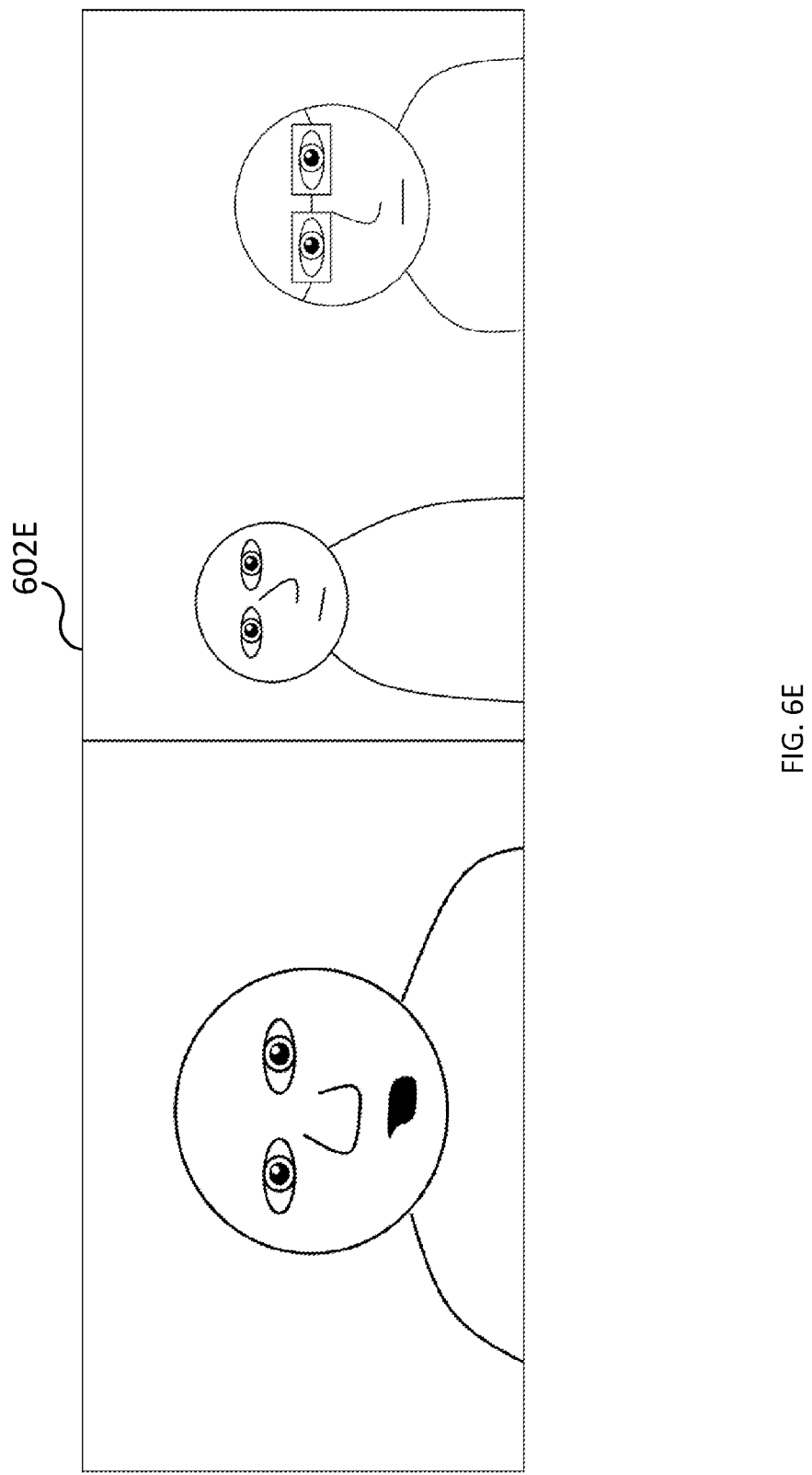

This is shown in FIG. 6E, where both the video streams of the primary (user 604) and the second and third user's (users 608 and 610) are shown simultaneously, adjacent to one another, in display window 602E. In this particular embodiment, User D is able to view both the primary user (who may be, for example a speaking user) as well as the arrival of (or exit of) User E at User B's location.

Figure 7A:
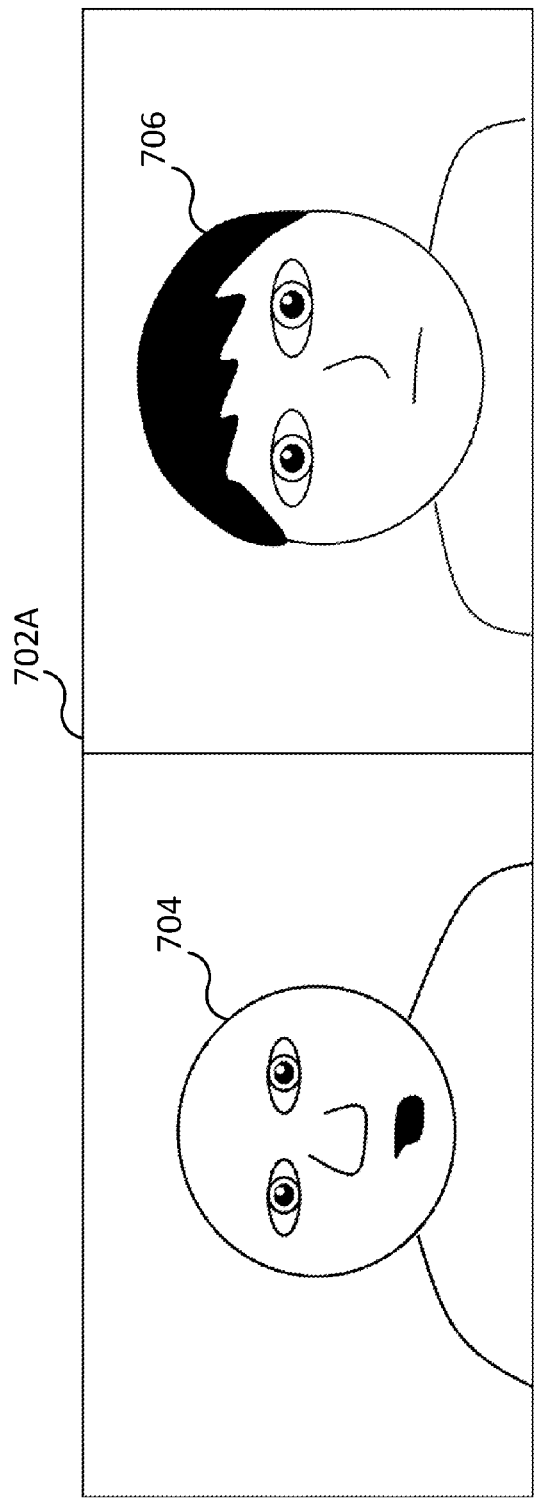

FIG. 7A shows an alternative embodiment in which two primary users, user 704 and user 706 are displayed at the display of a receiving terminal, during a first time interval, during the video conference. This may occur, for example, where both of the primary users are determined as being of equal importance (for example, where audio data has been recently detected for both users). Alternatively, this may be a default setting for a receiving user that is in a video conference with two other users (as shown in FIG. 1). User 704 may correspond to e.g. User A and User 706 may correspond to e.g. User C.

Again, during the first time interval, the control server may detect a change in the number of users detected in the moving image of a received video stream. For example, the control server may detect that user 710 (e.g. User E) has appeared in the video stream that previously carried a moving image of User B only. In response to detecting this change in the number of users, the control server may select the corresponding video stream for display at the receiving terminal.

In this particular embodiment, the control server may cause one of the video streams displaying a second primary user, user 706, to be replaced with the video stream associated with the video image in which a change in the number of users was detected. The control server may determine a relative priority of each of the video streams associated with the primary users (e.g. based on which of the two primary users spoke most recently), and based on this, select the video stream with the highest priority for display at the receiving terminal.

The control server may then continue to transmit the video stream associated with the highest priority to the receiving terminal, and also transmit the video stream associated with the detected change in the number of users, to the receiving terminal. This may involve sending new layout data to the receiving terminal, such that, in response to receiving the new layout data, the receiving terminal displays the video stream of a first primary user, user 704, as well as users 710 and 712, in a particular arrangement at the receiving terminal.

Figure 7B:
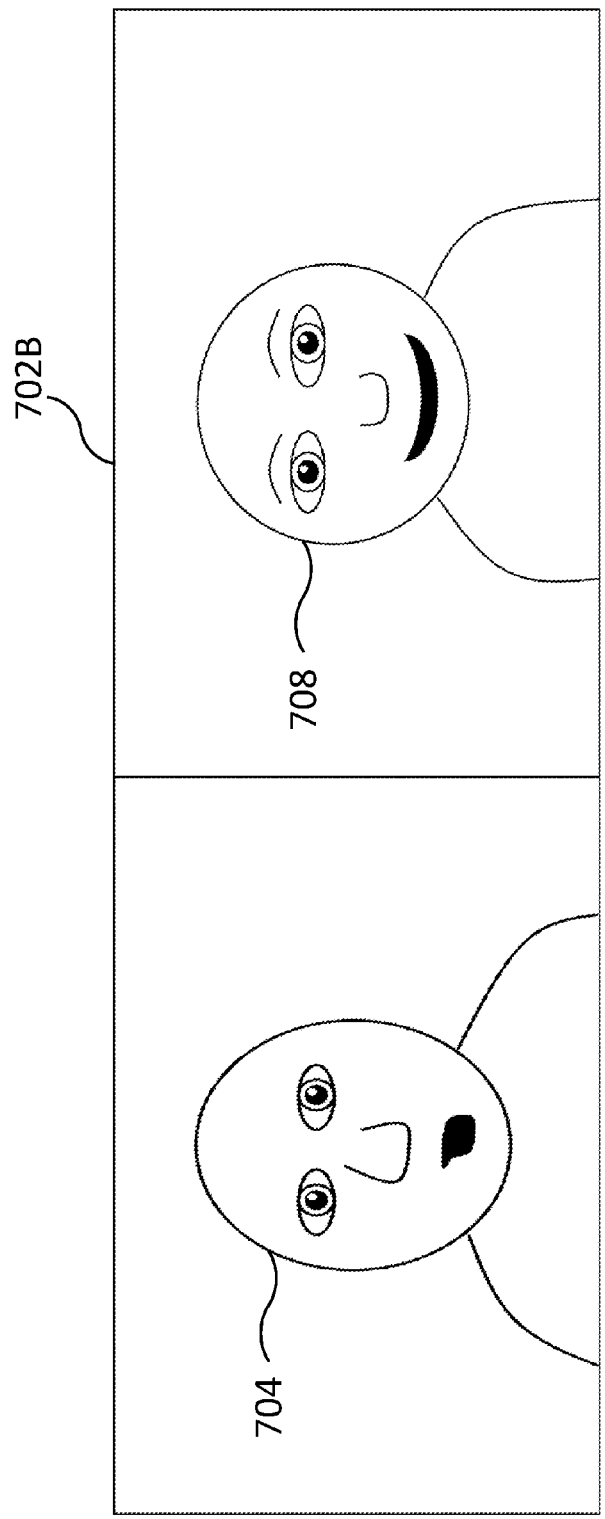
Figure 7C:
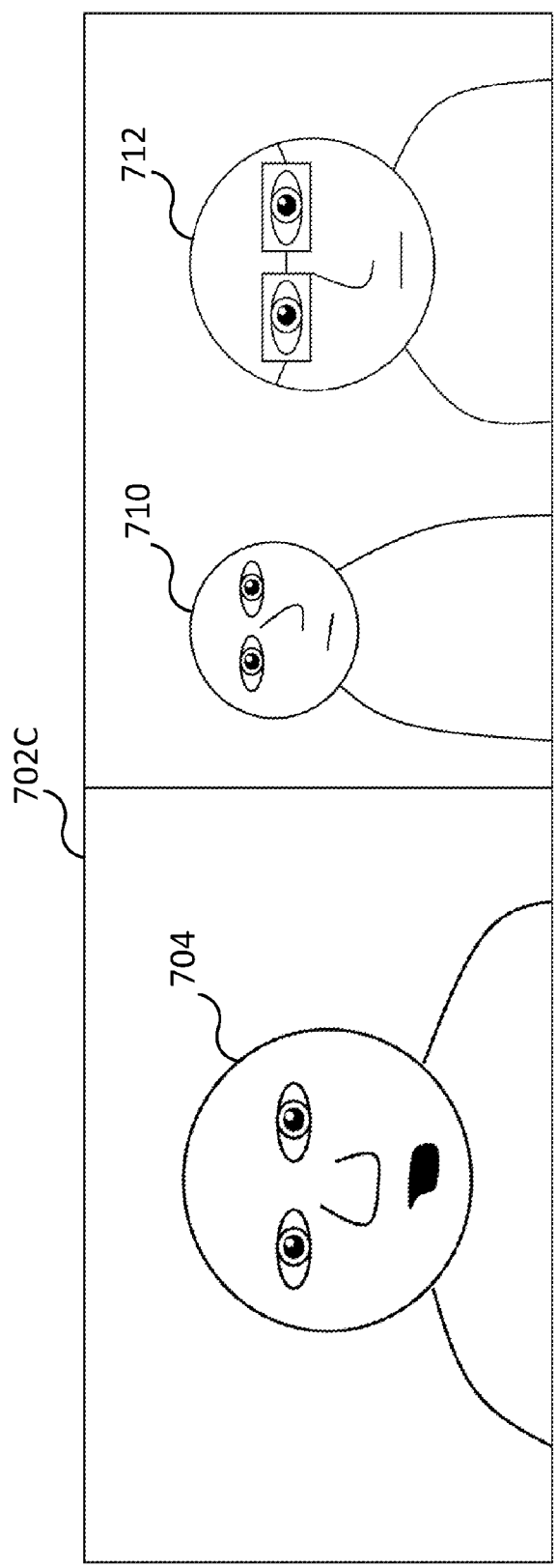

Such an arrangement is illustrated in FIG. 7C, where the moving image of primary user 706, has been replaced with the moving image of users 710 and 712 (which again, may correspond to Users B and E). Again, the moving image of users 710 and 712 is displayed for a predetermined time interval (the second time interval), which may be independent of the time interval for which the primary user, user 704, is displayed at the receiving terminal. In FIG. 7C, the video image of users 704, 710 and 712 is displayed in display window 702C.

FIG. 8A shows an alternative embodiment in which three primary users, user 804 (e.g. User A), user 806 (e.g. User F) and user 808 (e.g. User C) are displayed at the display of the receiving terminal. In this embodiment, the moving image of a third primary user 808 is replaced with the moving image of users 812 and 814 (e.g. Users B and E), as shown in FIG. 8C. As described in relation to FIGS. 7A and 7B, each of the video streams may be associated with a priority value, and this priority value may depend on whether the moving image of the respective video stream corresponds to a moving image in which a change in the number of users has been detected.

Video streams in which a change in the number of detected users has been detected may be associated with a higher priority value than a video stream in which no specific user activity has been detected (e.g. no speech or movement). A moving image with a higher priority value may occupy a larger segment of the receiving terminal's display, such as that occupied by user 804 in FIG. 8A.

In the example of FIG. 8C, the video stream associated with users 812 and 814 (e.g. users B and E) is of a high enough priority to replace the video of e.g. an inactive user, such as user 808 (e.g. User C) but not of a high enough priority to replace the video of a speaking user, such as user 804 (e.g. User A).

It will be appreciated that while FIGS. 8A and 8C are described in the context of replacing one of three primary video streams with a video stream in which a change in the number of users has been detected, any number of the three primary video streams may be replaced with video streams in which a change in the number of users has been detected (depending on the number of participants in the video conference, and the number of streams in which a change in the number of users has been detected etc.).

It will also be appreciated that, if the control server causes an increase in the number of video streams that are displayed at a receiving terminal, then any number of moving images in which a change in the number of users has been detected may be displayed in addition to the video streams associated with the one or more primary users.

For example, if a primary user is displayed in a first window 602A, and a change in the number of users is detected in the moving images of two other video streams, the first window 602A may be updated so as to display the video stream of the primary speaker, and the two other video streams in which a change in the number of users was detected. This may involve transmitting new layout parameters from the control server to the receiving terminal, e.g. layout parameters that enable the video streams to be displayed using grid layout 906 instead of grid layout 902 (FIG. 9).

For example window 602A may be replaced with a window akin to display window 802C shown in FIG. 8C, with the moving image of each video stream (in which a change in the number of users was detected) being displayed in one of the two smaller segments of the grid layout used for generating display window 802C. These two video streams may be displayed for the same or different time intervals, depending on how similar or different the detected change in the number of users is for each video stream.

In an alternative embodiment, the control server may increase the number of video streams that are displayed at a receiving terminal, such that a display window showing two primary users (e.g. the display window shown in FIG. 7A) is updated so as to also display the video stream associated with a change in the number of detected users (e.g. the display window shown in FIG. 8C), in addition to the video streams of the two primary users.

In addition to the above described techniques, signature body movement(s) and/or gesture(s) may trigger a camera view change in the video stage sequence and framing. An example gesture could be a combination of outward hand movement with a boxed finger framing gesture as a director or cinematographer would do on location for filming. Or could be a single hand "bloom" gesture depending on the activity and context of the active experience Alternatively or in addition to this, a vocal phrase such as, "Skype, Wide View" may trigger a certain stream associated with the voice input to be displayed to a particular user. A voice or gesture input may be provided that user themselves, or one of the other users on the call allowing users to in some cases explicitly control how the story view evolves for their own benefit, or for the benefit of other user(s).

In the embodiments described above the change in visual content has been described in relation to detecting a change in the number of users that are present in the moving image of a video stream. However, alternatively or additionally, a change in visual content may be detected based on an identification that a user has performed an expected movement. This embodiment, and variations thereof, are described below. It should be noted that in this embodiment, the same communication system 100 and user terminal(s) 6 as described previously in relation to FIGS. 1 and 2 is (are) used. This embodiment is thus described below in relation to FIG. 3 onwards.

Returning to FIG. 3, a feature tracking module is also shown having an input connected to the feature detection module 308 and an output connected to the selector 312.

Having identified that one of the video streams is carrying an image of a user, the skeletal tracking module of the feature detection module 308 may forward information about the detected user in the corresponding video stream to a feature tracking module 310. This information may comprise an indication of where the "skeleton" of the user was identified within the moving image, for example corresponding to predetermined points on the user's body, e.g. corresponding to known skeletal points. Either way, this allows the feature tracking module 310 to identify particular human features within the moving image. For example, the identified "skeleton" of the user may provide a reference from which the feature tracking module can identify and track the movement of one or more human features. Alternatively or additionally, the facial detection module may provide information about the detected face(s) to the feature tracking module 310, allowing the latter to track the corresponding facial movements.

Human features may include, for example, the arm, hands, and/or face of a user. Human features may also include more specific human features such as the eyes, mouth and nose of a user. By tracking the movement of these features over the time, the feature tracking module 310 is able to detect and distinguish between different types of reaction that an identified user is having. For example, the feature tracking module 310 may be able to identify user reactions such as: smiling, laughing, frowning, gasping, head nodding, head shaking, hand waving, hand pointing, clapping, giving a thumbs up, raising or lowering their arms, celebrating with e.g. clenched fists etc.

The feature tracking module 310 may identify a user's reaction by comparing the movement of one or more identified human features with the entries of a database 304 storing predetermined, i.e. expected movements of the corresponding human features. The database of expected movements 304 may be stored in memory 302 at the control server.

For example, each expected movement may be defined by a set of parameters describing the movement of one or more human features. The feature tracking module 310 may determine the parameters describing the movement of one or more human features of an identified user and compare these to the parameters describing known, i.e. expected movements, to determine whether the user has performed an expected movement.

If the feature tracking module 310 determines that the identified user's movement of one or more human features corresponds to one of the expected movements in the database 304 the feature tracking module 310 may provide an indication that the expected movement has been detected, to a selector 312.

Selector 312 is configured to receive each of the plurality of video streams received at the network interface 314, and to determine which of these to cause to be displayed at one or more user terminals. In the example of FIG. 3, selector 312 is configured to determine which of the video streams s1, s2 and s3 to cause to be displayed as User D's user terminal (i.e. the receiving terminal).

Selector 312 is also configured to receive an indication from feature tracking module 310 of any expected movements, i.e. reactions, that have been detected in any of the video streams received at the selector 312. This indication is herein referred to as the "reaction indicator".

The reaction indicator may inform the selector 312 of any reactions" (i.e. expected movements) that were identified in one or more of the video streams received at the selector 312. This enables the selector 312 to determine which of the plurality of received video streams to select for display at a particular user's user terminal (in this example, user D's user terminal 6d).

The reaction indicator also enables the selector 312 to determine a time interval for which the video stream associated with that reaction should be displayed at a particular receiving terminal (again, in this example, user D's user terminal 6d). For example, the selector 312 may use the reaction indicator to query the entries of a database storing a list of pre-determined reactions and the time intervals for which those reactions should be displayed at a receiving terminal. The entries of such a database are shown in FIG. 4A (discussed later).

The selector 312 may for example, use the time interval associated with an identified reaction to determine the duration for which a selected video stream should be transmitted to a particular receiving terminal (e.g. user D's user terminal 6d).

The selector 312 may also use the reaction indicator to determine a priority associated with the identified reaction. For example, certain reactions may be deemed more worthy of display than others, and this may be indicated in the associated priority value (i.e. the higher the priority value, the more likely it is that the associated video stream is selected for display).

In a situation where reactions are detected in multiple video streams, but only a limited number of video streams can be displayed at a particular receiving terminal, the selector 312 may use the priority value associated with each of the detected reactions to determine which of the associated video streams to select for display at the receiving terminal.

The priority value may also determine the manner in which a selected video stream is displayed relative to any other video streams that are also selected for display at the receiving terminal (i.e. relative position and size).

Having determined which of the plurality of video streams to display at the receiving terminal (e.g. user D), the selector 312 may also select a particular layout for displaying the one or more selected video streams (streams s1 and s2 in FIG. 3).

The selector 312 may have stored in memory, a selection of grid layouts, and the selector 312 may select a particular grid layout for displaying the one or more selected video streams. The grid selected by the selector 312 may depend on the number of video streams that the selector 312 has selected for display at a particular user terminal. The selector 312 may have stored in memory, a selection of grid layouts, and the selector 312 may select a particular grid layout for displaying the one or more selected video streams. The grid selected by the selector 312 may depend on the number of video streams that the selector 312 has selected for display at a particular user terminal. The moving images of the selected video streams may need to be cropped so as to be displayed at a particular location in the grid. For example, the one or more moving images may be cropped so as to display the most important information. The moving images may be cropped according to a tight, medium or wide view, depending on the detected expected movement and the selected grid layout.

The selector 312 may also use the priority associated with the reaction identified in a selected video stream (based e.g. on whether a reacting or speaking user was detected) to determine where, within the selected grid layout, that video stream is to be displayed. Some examples of possible grid layouts are shown in FIG. 9. For example, grid layout 902 may be used to display a single video stream, grid layout 904 may be used to display two video streams simultaneously and grid layout 906 may be used to display three video streams simultaneously. Whilst only three grid layouts are shown in FIG. 9, it will be appreciated that a grid layout may be selected so as to display any number of video streams. For example, a grid layout comprising four units may be selected to display four selected video streams. Whilst the grid layouts shown in FIG. 9 are all shown with rectangular units, the units of each grid may be of any shape and are not constrained so as to all be of the same shape.

For greater story continuity and fluid transitions between the different video streams that are displayed at the receiving terminal, the selector may be configured to ensure that there is a limited duration of time in which the units of the selected grid layout can be updated (i.e. a new video stream can be selected for display, at that unit of the grid).

For example, in one embodiment, the selector may ensure that only one unit of the selected grid is changed at a time—i.e. no new video streams are displayed at any of the other units of the grid, during the second time interval.

Alternatively, in a second embodiment, the selector may ensure that there is limited duration of time in which multiple units of the selected grid layout can be updated (i.e. to display the video streams in which a change in the number of users was detected). For example, following e.g. the selection of a first video stream, the selector may only allow other units of the selected grid to be updated, if these can be updated before the limited duration of time elapses.

These embodiments ensure that the least amount of video grid view updates occur within a designated duration of time, thereby making it as easy as possible for users to follow user activity within the Storied Experienced View. The selected grid and positioning of each of selected video streams within the grid may be indicated to the receiving user terminal (e.g. terminal 6d) in the form of layout parameters, as shown in FIG. 3. The receiving user terminal may interpret the layout parameters so as to display each of the selected video streams at their respective positions in the selected grid.

For example, referring to FIG. 3, the selector 312 may receive an indication that reactions were detected in streams s1 and s2 and based on this, select streams s1 and s2 for transmission to user 4d's user terminal. The selector 312 may select, for example, grid layout 904, shown in FIG. 9, and forward the corresponding layout parameters to the receiving terminal. In response to receiving the layout parameters, the receiving terminal may then render the two video streams such that the first video stream, s1, is displayed at a first location of the grid (e.g. the left-hand unit of the grid), and the second video stream, s2, is displayed at a second location of the grid (e.g. the right-hand unit of the grid). In some embodiments, it may not be necessary to send of all the layout parameters to the receiving terminal, if for example, there is no change in the number of video streams that are to be displayed at the receiving terminal (as described later in relation to FIGS. 7A and 7B).

Alternatively, the reaction indicator may indicate that a reaction was detected in stream s2 only. Based on this, the selector 312 may determine to increase the number of video streams displayed at user 4d's user terminal 6d, by continuing to transmit stream s1 (which was displayed at user 4d's user terminal 6d, prior to detecting a reaction from User 4B) and also transmitting stream s2 to User D. User D is thus be able to view the reaction of User B, in addition to the video of User A. In this particular example, user A may be for example, a speaking user, while user B is a reacting user, reacting to user A's speech. The control server may transmit layout parameters for grid layout 904, instead of the layout parameters for 902, which were previously used to display User A's video stream (as described later in relation to FIGS. 6A and 6C).

Continuity is important for the storied experience; if an event is tagged as relating to a certain location it may replace that location's current video stream location in the grid for the new duration timed event (i.e. the second time interval), whereas a newly promoted event may occupy an added grid location or grid escalation.

Stylized grid, duration and location playback may have unique rules for unique circumstances. For example, an end of meeting "montage" could display a series of related and unrelated events next to each other in the grid as a stylized reprise of the meeting event. For example, the duration timer for each event could be aligned or intentionally rhythmic to an audio track.

FIG. 4A shows a high-level representation of a database that may be used by the control server to determine a priority associated with a reaction identified in one or more of the received video streams. As can be seen in FIG. 4A, a first column 402 of the database may contain entries for each expected "movement" (i.e. reactions). For example, M1 may correspond to "smiling", M2 may correspond to "head nodding", M3 may correspond to "head shaking", and so on and so forth.

A second column of the database 404 may contain entries for the priorities associated with each expected movement. For example, movement M1 (e.g. smiling) may have a priority value P1, which is higher or lower in value than the priority value P2 associated with movement M2 (e.g. head nodding). The priority values of each respective movement may be used to determine the manner in which video streams are displayed relative to one another. For example, a video stream featuring a higher-priority reaction may be displayed more prominently than a video stream featuring a lower-priority reaction. The priority values may be used, for example, to determine which of the units of a grid layout (such as those shown in FIG. 9) a selected video stream occupies.

The priorities may also be used to limit the number of video streams that are selected for display at a receiving terminal—for example, if reactions are detected in multiple video streams but only a limited number of video streams can be displayed (effectively) at a particular receiving terminal, the priority values may be used to determine which of those video streams are selected for display.

In certain embodiments, there may be a limit on the number of detection types that can occur within a certain duration of time, i.e. to control the amount of coverage that is displayed to a user within a specific duration of time. Over coverage of user activity may become disorienting to the user viewing it; it is therefore important to strike the balance between expanding the storied awareness of user activity whilst guarding against over coverage.

It will be appreciated that, whilst an individual priority value is shown for each expected movement, several movements may share the same priority value and be grouped according to this priority value. For example, rather than having a priority value associated with each movement, movements may be grouped according to e.g. the type of movement, and movements of the same "type" may share the same priority value. The "type" of a particular movement may determine its corresponding priority value.

A third column of the database 406A may contain entries for the time interval associated with each movement, that is, the time interval for which the video stream associated with that movement should be displayed at a receiving terminal. Different expected movements may be associated with different time intervals depending on the nature of the movement. For example, a movement that involves the movement of the whole of a user's body may have a time interval that is longer than a movement that corresponds to e.g. "smiling". The control server may use the time interval to determine when to stop transmitting the video stream associated with a particular movement, to a particular receiving terminal. Three types of time interval (i.e. durations) are described below.

Short Duration:

A set duration attached to a non-verbal event. Short would be set to a specific duration (example: 1.5 seconds). Allowing the priority assigned video to priority stack in the video story for consuming participants but not interrupt the active speaking audio signal. The active speaking audio signal would remain constant. Short will be assigned to participant activity that is added awareness but not essential at an extended activity. Including reaction shots: smiling, head nodding, head shaking, hand waving, hand pointing . . . ).

Medium Duration:

A set duration attached to a non-verbal event. Medium would be set to a specific duration (example: 2.5 seconds). Allowing the priority assigned video to priority stack the video story for consuming participants but not interrupt the active speaking audio signal. The active speaking audio signal would remain constant. Medium is assigned to specific activities deemed important to group activity awareness such as a change of body location in the room. Or a detection of a new body or person in the room (stand, sit, walk enter, leave a location).

Extended Duration:

The set duration for dominant activity participants. This duration is primarily assigned to active speaker. Giving active speaker the dominant story priority unless interrupted by a short duration story view or depreciated due to lack of speaking. An example of this is if story view is in single grid view and is an edge to edge video of active speaker. When a short or medium duration priority video is triggered to replace the active speaker video (but not the active audio) once the limited duration video has timed out it is replaced by the continuous active speaker video view that was populated at this location previously.

Persistent Duration:

The set duration for dominant activity participants. This duration is primarily assigned to a user pinned or view type that does not allow a video view to be interrupted. Thus duration is continuous until the user re-assigns the view or the meeting ends.

Non-verbal communication duration priority metric for: body, arm, hand, gesture, head, face and eye movement detection for story video priority metric. Duration priority metric works in conjunction with a playback durations library: short, medium, priority, and extended specification. As well as story grid location priority designated by a stack ranking of most recent activity, participant association or user preference.

For greater story continuity and fluid people engagement experiences the camera view grid updates should also be populated as a single or a group in a set duration of time whether it be from a single location or multiple locations. This is to ensure that the video playback is as fluid and noise-free as possible. It is also to ensure the least amount of video grid view updates occur within a designated duration of time, thereby allowing the story experience to be as engaging and easy to follow the action.

It should also be noted that, for the durations described above, user or participant tagging may also influence the system priority stack. For example, a user may tag sensor data (video views) and a priority may be placed on those views for real-time story playback, recording, or editing after the event.

It will be appreciated that, whilst a separate column is shown in FIG. 4 for the priority and time interval of each respective movement, these two parameters may in fact be correlated (i.e. derivable from one another).

For example, the priority value of an expected movement may also determine the time interval for which it is displayed. For example, an expected movement with a higher priority value may be displayed for longer than an expected movement with a lower priority value. Alternatively, an expected movement with a lower-priority value may be displayed for a longer time interval.

Ultimately, any relationship between the priority value and time interval may be used. This relationship may allow time intervals to be determined 'on the fly' for each identified expected movement. That is, rather than storing a time interval for each of the possible expected movements in a database, the database may contain entries for the priority values only, and use these to determine the time interval associated with a particular movement, as and when that movement is identified within a particular video stream.

One or more other columns 408A of the database may contain entries pertaining to other parameters. For example, these parameters may relate to the grouping of different types of reactions, e.g. reactions involving hand movements may belong to a particular group, whilst reactions involving changes in a user's facial expression may belong to a different group. Each expected movement may be associated with a group value and expected movements sharing the same group value may be deemed to be of the same "type" (which may indicate that they share the same priority values and/or time intervals).

Additionally, the database may include a column for the parameters defining each expected movement. These parameters may define, for each expected movement, the corresponding changes in the relative positioning of a user's eyes, nose, mouth, eyebrows, hands etc. These parameters may also be associated with a margin of error—i.e. a range in which the relative positioning of a user's eyes, nose, mouth, eyebrows, hands etc. may change, and still be identified as corresponding to the respective expected movement.

FIG. 5A illustrates a flowchart of the method performed at the control server for determining when to select a video stream for display at a receiving terminal (e.g. User D's user terminal), based on an identification of an expected movement in the moving image of that video stream.

It should be noted that, whilst FIG. 5A only shows a method for determining whether to select a single video stream for display at a receiving terminal, the control server may perform multiple instances of the described method, e.g in parallel, in order to determine whether a plurality of video streams should be selected for display at a receiving terminal.

At step, S502, a plurality of video streams are received at the control server (i.e. at the network interface of the control server). For example, these video streams may be received from the user terminals associated with users A, B and C.

Alternatively, two or more of these video streams may be received from a single camera device, associated with two or more of users A, B and C.

At step S504, the control server selects a subset of the received video streams for display at the receiving terminal. The control server causes these video streams to be displayed at the receiving terminal, i.e. by transmitting them, along with any associated layout parameters, to the receiving terminal.

At step S506, the control server identifies a video stream that is not currently being displayed at the receiving terminal (herein referred to as "the identified video stream"). For example, each of the video streams received at the control server may include an indication of whether or not they are currently being displayed at the receiving terminal. The control server may use these indications to identify a video stream that is not currently being displayed at the receiving terminal.

Alternatively, a separate module within the control server (not shown in FIG. 3) may keep track of the video streams that were previously selected for display at the receiving terminal. This information may be used by the control server to identify a video stream that is not currently being displayed at the receiving terminal.

At step S508, the control server identifies one or more human features of the user identified within the identified video stream. As noted earlier in relation to FIG. 3, the feature detection module 308 may identify that a user is present in the identified video stream (e.g. based on skeletal and/or facial tracking) and a feature tracking module 310 may use this information to identify one or more human features of the identified user.

At step S510A, the control server tracks the movement of the one or more identified human features. This may involve, for example, tracking the movement of a user's eyes and mouth, to determine whether the user is smiling or frowning etc.

At step S512A, the control server identifies that the movement of the one or more human features corresponds to an expected movement, i.e. a known "reaction". As noted earlier in relation FIG. 3, this may involve determining parameters for the identified movement and comparing these with the parameters defining expected movements.

At step S514, the control server determines whether to cause the identified video stream to be displayed at the receiving terminal. If the control server determines that the identified video stream should not be displayed at the receiving terminal (indicated by 'NO' in FIG. 5), the control server continues to track the one or more identified human features of the user identified in the identified stream.

The control server may, for example, determine a priority value associated with the identified movement, and determine whether this value is higher than a priority value determined for a second video stream in which an expected movement was also identified. If, for example, the priority value of the expected movement in the identified stream is lower than the expected movement detected in the second video stream, the control server may determine that the identified video stream should not be displayed at the receiving terminal. If, whilst displaying the video stream in which an expected movement was detected, the audio of a new speaking user is detected, the control server may ensure that once the second time interval has elapsed, the video stream associated with the new speaking user is selected for display (and caused to be displayed) at the receiving terminal.

If the control server determines that the identified video stream should be displayed at the receiving terminal (indicated by 'YES' in FIG. 5), the control server selects the video stream for display at the receiving terminal.

At step S516, the control server determines the time interval for which the selected video stream should be displayed and any layout parameters that are needed in order to define the way in which the selected video stream will be displayed at the receiving terminal (e.g. relative to any other video streams that have been selected for display at the receiving terminal).

In one embodiment, the time interval associated with the selected video stream may be derived, for example, from the priority associated with the identified "expected movement". As noted earlier in relation to FIG. 3, each of the "expected movements" may be associated with a priority, and the priority may determine where, and for how long, the selected video stream is displayed at the receiving terminal.

At step S518, the control server transmits the selected video stream to the receiving terminal, along with any associated layout parameters. As noted earlier, the layout parameters are used by the receiving terminal to determine the manner in which the selected video stream is to be displayed.

At step S520, the control server detects that the time interval associated with the selected video stream has elapsed and stops sending the selected video stream. In response to the time interval elapsing, the control server may transmit new layout data to the receiving terminal, thereby ensuring that screen space is not allocated to video streams that are no longer being transmitted to the receiving terminal, from the control server.

FIG. 6A illustrates an example of a moving image of a user, user 604, that may be displayed at the display of User D's user terminal, during a first time interval, during the video conference.

User 604 may be a user that has been determined to be important, based e.g. on a recent detection of the user's speech, or the user having initiated the video conference. This user is herein referred to as the "primary user", with an associated "primary video stream".

During the first time interval, the control server may determine that a second user has reacted to the actions performed by primary user 604. For example, the control server may identify that a second user, herein referred to as the "reacting user" 606, has smiled during the first time interval. In response to detecting the reacting user's smile, the control server may select the video stream associated with the reacting user for display at the receiving user's user terminal. This video stream is herein referred to as the "reacting user's video stream".

An example embodiment is illustrated in FIG. 6B, where the moving image of primary user 604, has been replaced with the moving image of reacting user 606. As noted earlier, the moving image of the reacting user is displayed for a predetermined time interval (the second time interval). The control server may ensure that the video of the primary user is not transmitted to User D, for the duration of this time interval.

The control server may also ensure that any audio (i.e. detected speech) associated with the primary user is still transmitted to User D. That is, the control server may treat the video and audio streams of each user (e.g. users A, B and C) separately, and only determine which of the video streams (and not audio streams) to select for display User D's user terminal. Hence, User D is able to continue to listen to the speech of the primary user, whilst also viewing the reactions of other users, as and when they occur.

When a single grid video view is streaming from a location and a new video priority type is detected, a duration type is assigned to that video depending on the detection type and it replaces the lower priority video stream. In most cases non-verbal communication is a video duration priority only. The audio priority stack preforms separately.

In an alternative embodiment, in response to determining that a second user has reacted to the actions performed by primary user 604, the control server may continue to transmit the primary video stream to User D's user terminal, and also select the reacting user's video stream for transmission to (and subsequent display at) User D's user terminal. This may also include transmitting new layout parameters to User D's user terminal 6d—i.e. layout parameters that ensure that the two video streams are displayed using grid layout 904 (FIG. 9).

This is shown in FIG. 6D, where both the video streams of the primary and reacting user's are shown simultaneously, adjacent to one another, at the display of User D's user terminal. In this particular embodiment, User D is able to view both the primary user (who may be, for example a speaking user) as well as the reaction of user 606 (who may be reacting to what the primary user is saying).

FIG. 7A shows an alternative embodiment in which two primary users may be displayed at the display of the receiving terminal, during a first time interval, during the video conference. This may occur, for example, where both of the primary users are determined as being of equal importance (for example, where audio data has been recently detected for both users). Alternatively, this may be a default setting for a receiving user that is in a video conference with two other users (as shown in FIG. 1). Again, during the first time interval, the control server may identify that a third user— the reacting user, has smiled during the first time interval. In response to detecting the reacting user's smile, the control server may select the reacting user's video stream for display at the receiving terminal.

In this particular embodiment, the control server may cause one of the video streams displaying a second primary user, user 706, to be replaced with the video stream associated with the reacting user, 708. The control server may determine a relative priority of each of the video streams associated with the primary users (e.g. based on which of the two primary users spoke most recently), and based on this, select the video stream with the highest priority for display at the receiving terminal.

The control server may then continue to transmit the video stream associated with the highest priority to the receiving terminal, and also transmit the reacting user's video stream to the receiving terminal. This may involve sending new layout data to the receiving terminal, such that, in response to receiving the new layout data, the receiving terminal displays the video stream of a first primary user, user 704, and the reacting user, 708, in a particular arrangement at the receiving terminal.

Such an arrangement is illustrated in FIG. 7B, where the moving image of primary user 706, has been replaced with the moving image of reacting user 708. Again, the moving image of the reacting user is displayed for a predetermined time interval (the second time interval), which may be independent of the time interval for which the primary user, user 704, is displayed at the receiving terminal.

FIG. 8 shows an alternative embodiment in which three primary users are displayed at the display of the receiving user's user terminal. In this embodiment, the video stream of a third primary user 808 is replaced with the video stream of a reacting user 810. As in FIGS. 7A and 7B, each of the video streams may be associated with a priority, and the video stream with the lowest priority may be replaced with the video stream associated with the reacting user. Additionally, the reacting user's video stream may occupy a larger segment of the receiving terminal's display, depending on the priority associated with the identified reaction.

In the example of FIG. 8, the detected smile of the reacting user is of a high enough priority to replace the video of e.g. an inactive user, but not of a high enough priority to replace the video of a speaking user, such as user 804.

It will be appreciated that while FIG. 8 is described in the context of replacing one of three primary video streams with a reacting user's video stream, any number of the three primary video streams may be replaced with the video streams of a reacting user (depending on the number of participants in the video conference, and the number reacting users etc.).

It will also be appreciated that, if the control server causes an increase in the number of video streams that are displayed at a receiving terminal, then any number of reacting users may be displayed in addition to the one or more primary users.

For example, if a primary user is displayed in a first window 602A, and a reaction is identified in the video streams of two other users, the first window 602A may be updated so as to display the video stream of the primary speaker, as well as the video streams of the two other reacting users. This may involve transmitting new layout parameters from the control server to the receiving terminal, e.g. layout parameters that enable the video streams to be displayed using grid layout 906 (FIG. 9) instead of grid layout 902 (FIG. 9).

For example window 602A may be replaced with a window akin the display window 802B shown in FIG. 8B, but with a reacting user displayed in each of the two smaller segments of the display window. The two reacting user's video streams may be displayed for the same or different time intervals, depending on the reaction identified in each of the video streams (e.g. whether they both belong to a group of reactions that share the same or similar time intervals).

In an alternative embodiment, the control server may increase the number of video streams that are displayed at a receiving terminal, such that a display window showing two primary users (e.g. the display window shown in FIG. 7A) is updated so as to also display the video stream of a reacting user (e.g. the display window shown in FIG. 8B), in addition to the video streams of the two primary users.

When a multi-grid video story view is streaming for group activity and a new video priority type is detected, a duration type is assigned to that new video depending on the detection type. The duration type determines how long the singular priority will last until the priority is reset to the current detected participant activity or is overruled by a higher priority video. In a multi-grid scenario, the least active video is replaced by the new duration type priority video. Unless it is tagged as related to a specific location or participant. Then it replaces the grid view of that same participant or location feed for only the specified time to maintain story continuity.

Generally, unless otherwise indicated, any of the functions described herein can be implemented using software, firmware, hardware (e.g., fixed logic circuitry), or a combination of these implementations. The terms "module," "functionality," "component" and "logic" as used herein generally represent software, firmware, hardware, or a combination thereof. In the case of a software implementation, the module, functionality, or logic represents program code that performs specified tasks when executed on a processor (e.g. CPU or CPUs). The program code can be stored in one or more computer readable memory devices. The features of the techniques described below are platform-independent, meaning that the techniques may be implemented on a variety of commercial computing platforms having a variety of processors.

For example, the user terminals may also include an entity (e.g. software) that causes hardware of the user terminals to perform operations, e.g., processors functional blocks, and so on. For example, the user terminals may include a computer-readable medium that may be configured to maintain instructions that cause the user terminals, and more particularly the operating system and associated hardware of the user terminals to perform operations. Thus, the instructions function to configure the operating system and associated hardware to perform the operations and in this way result in transformation of the operating system and associated hardware to perform functions. The instructions may be provided by the computer-readable medium to the user terminals through a variety of different configurations.

One such configuration of a computer-readable medium is signal bearing medium and thus is configured to transmit the instructions (e.g. as a carrier wave) to the computing device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may us magnetic, optical, and other techniques to store instructions and other data According to a first aspect, the subject-matter of the present application provides a method effecting a communication event between a first user and one or more second users via a communication network, the method comprising implementing on a computer connected to the network: receiving, via the network, a plurality of video streams, each carrying a respective moving image of one or more users; causing the respective moving image of a first of the video streams to be displayed at a user device of the first user for a first time interval; detecting a change in the visual content of the respective moving image of a second of the video streams that is not being displayed at the user device during the first time interval; and in response to detecting said change in the visual content, causing the respective moving image of at least the second stream to be displayed at the user device for a second time interval.

In embodiments, the change in visual content may be a change in the total number of users in the moving image.

The computer may determine the duration of the second time interval based on the change in the visual content detected in the moving image of the second video stream. This change may be detected by the computer applying a facial detection algorithm to the respective moving image of the second video stream to detect a change in the total number of faces in the moving image of the second video stream during the first time interval.

Additionally, or alternatively, the change in the total number of users may detected by the computer applying a skeletal tracking algorithm to the respective moving image of the second video stream to detect a change in the total number of skeletons in the moving image of the second video stream during the first time interval.

The computer may assign a first priority value to the second video stream for the first time interval, and in response to detecting the change in the visual content, assign a second priority value denoting a higher priority to the stream; and the computer may use the second priority value to select the second stream from the plurality of video streams for said displaying at the user device for the second time interval.

In some embodiments, causing at least the respective moving image of the second video stream to be displayed at the user device may comprise causing the respective moving image of the first video stream to be replaced with that of the second video stream, such that the respective moving image of first video stream is not displayed at the user device for the second time interval.

In alternative embodiments, both the moving images of the first and second video streams may be displayed simultaneously at the user device for the second time interval.

The computer may be separate from the user device and the computer may cause the moving image of each of the first and second video streams to be displayed at the user device, by transmitting that stream to the user device via the network for displaying thereat.

In further embodiments, the respective moving image of a third of the video streams may be displayed at the user device in the first time interval in addition to the first video stream, and the computer may cause the respective moving image of the third video stream to be replaced with that of the second video stream, such that the respective moving image of the third video stream is not displayed at the user device for the second time interval.

The method according to the first aspect may also comprise: in response to detecting said change in the visual content, selecting one of a plurality of predetermined layouts for displaying the respective moving image of the second video stream at the user device for the second time interval, wherein each of the plurality of predetermined layouts is for displaying a different number of video streams at the user device, wherein a different one of the predetermined layouts is used to display the respective moving image of the first stream in the first time interval.

In some embodiments, at least two of the plurality of streams may be received from different communication client instances, each of the different communication client instances being executed at a different user device. Each of the different communication client instances may be received from a different communication client instance executed on a different user device.

The computer may be embodied in a server.

The computer may be embodied in the user device.

According to a second aspect, the subject-matter of the present application provides a computer for effecting a communication event between a first user and one or more second users via a communication network, the computer comprising: a network interface configured to receive, via the network, a plurality of video streams, each carrying a respective moving image of one or more users; a processor configured to perform operations of: causing the respective moving image of a first of the video streams to be displayed at a user device of the first user for a first time interval; detecting a change in the visual content of the respective moving image of a second of the video streams that is not being displayed at the user device during the first time interval; and in response to detecting said change in the visual content, causing the respective moving image of at least the second stream to be displayed at the user device for a second time interval.

The processor may be configured to determine the duration of the second time interval based on the change in the visual content detected in the moving image of the second video stream.

The change may be detected by applying a facial detection algorithm to the respective moving image of the second video stream to detect a change in the total number of faces in the moving image of the second video stream during the first time interval.

Additionally or alternatively, the change may be detected by applying a skeletal tracking algorithm to the respective moving image of the second video stream to detect a change in the total number of skeletons in the moving image of the second video stream during the first time interval.

According to a third aspect, the subject-matter of the present application provides computer program product for effecting a communication event between a first user and one or more second users via a communication network, the computer program product comprising code stored on a computer readable storage medium and configured when executed on a computer to perform the following operations: receiving, via the network, a plurality of video streams, each carrying a respective moving image of one or more users; causing the respective moving image of a first of the video streams to be displayed at a user device of the first user for a first time interval; detecting a change in the visual content of the respective moving image of a second of the video streams that is not being displayed at the user device during the first time interval; and in response to detecting said change in the visual content, causing the respective moving image of at least the second stream to be displayed at the user device for a second time interval.

According to a fourth aspect, the subject matter of present application provides a computer-implemented method of effecting a communication event between a first user and one or more second users via a communication network, the method comprising implementing on a computer connected to the network: receiving, via the network, a plurality of video streams, each carrying a respective moving image of at least one respective user; causing the respective moving image of a first of the video streams to be displayed at a user device of the first user for a first time interval; identifying in the respective moving image of a second of the video streams that is not displayed at the user device in the first time interval, a human feature of the respective user; detecting a movement of the identified human feature during the first time interval that matches one of a plurality of expected movements; and in response to the detected movement, causing the respective moving image of at least the second video stream to be displayed at the user device for a second time interval.

The computer may determine the duration of the second time interval based on which of the plurality of expected movements the movement of the identified human feature is detected as matching.

Each of the plurality of expected movements may be associated with a priority value, and the computer may use the priority value to select the second stream from the plurality of video streams for said displaying at the user device for the second time interval.

The computer may be embodied in a server.

The computer may be embodied in the user device.

In some embodiments, causing at least the second video stream to be displayed at the user device may comprise replacing the first video stream with the second video stream, such that the first video stream is not displayed at the user device for the second interval.

In other embodiments, both the first and second video streams may be displayed at the user device for the second interval.

The computer may be separate from the user device and the computer may cause the moving image of each of the first and second video streams to be displayed at the user device, by transmitting that stream to the user device via the network for displaying thereat.

In further embodiments, a third video stream may be displayed at the user device in the first time interval in addition to the first video stream and the third video stream may be replaced with the second video stream for the second interval, such that the third video stream is not displayed at the user device for the second interval.

The computer implemented method of the fourth aspect may also include: in response to detecting said movement, selecting a first of a plurality of predetermined layouts for displaying at least the second video stream at the user device for the second time interval, wherein each of the plurality of predetermined layouts is for displaying a different number of video streams at the user device, wherein a different one of the predetermined layouts is used to display the first stream in the first time interval.

In some embodiments, the computer implemented method may cause audio data associated with the first video stream to be played out at the user device during both the first and the second time intervals. The audio data may be played out in the first and second time intervals in response to the computer detecting that the user in the moving image of the first video stream is speaking.

In further embodiments, at least two of the plurality of streams may be received from different communication client instances, each of the different communication client instances being executed at a different user device. Each of the video streams may be received from a different communication client instance executed on a different user device.

According to a fifth aspect, the subject-matter of the present application provides computer for effecting a communication event between a first user and one or more second users via a communication network, the computer comprising: a network interface configured to receive, via the network, a plurality of video streams, each carrying a respective moving image of one or more users; a processor configured to perform operations of: causing the respective moving image of a first of the video streams to be displayed at a user device of the first user for a first time interval; identifying in the respective moving image of a second of the video streams that is not displayed at the user device in the first time interval, a human feature of the respective user; detecting a movement of the identified human feature during the first time interval that matches one of a plurality of expected movements; and in response to the detected movement, causing the respective moving image of at least the second video stream to be displayed at the user device for a second time interval.

The computer may determine the duration of the second time interval based on which of the plurality of expected movements the movement of the identified human feature is detected as matching.

Each of the plurality of expected movements is associated with a priority value, and the computer uses the priority value to select the second stream from the plurality of video streams for said displaying at the user device for the second time interval.

At least one of the plurality of expected movements may include a movement that corresponds to a user in the moving image of the second video image: smiling, frowning, laughing, gasping, nodding their head, shaking their head, pointing in a particular direction with one or both of their hands, waving with one or both of their hands, raising or lowering one or both of their arms above or below a predetermined height, clapping, moving one or more clenched fists so as to indicate celebration or frustration, and giving a thumbs up or down with one or both of their hands.

The computer of the fifth aspect may also include a processor configured to perform the operation of: in response to detecting said movement, selecting a first of a plurality of predetermined layouts for displaying at least the second video stream at the user device for the second time interval, wherein each of the plurality of predetermined layouts is for displaying a different number of video streams at the user device, wherein a different one of the predetermined layouts is used to display the first stream in the first time interval.

According to a sixth aspect, the subject-matter of the present application provides a computer program product for effecting a communication event between a first user and one or more second users via a communication network, the computer program product comprising code stored on a computer readable storage medium and configured when executed on a computer to perform the following operations: receiving, via the network, a plurality of video streams, each carrying a respective moving image of one or more users; causing the respective moving image of a first of the video streams to be displayed at a user device of the first user for a first time interval; identifying in the respective moving image of a second of the video streams that is not displayed at the user device in the first time interval, a human feature of the respective user; detecting a movement of the identified human feature during the first time interval that matches one of a plurality of expected movements; and in response to the detected movement, causing at least the second video stream to be displayed at the user device for a second time interval.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A computer-implemented method of effecting a communication event between a first user and one or more second users via a communication network, the method comprising implementing on a computer connected to the network:
   receiving, via the network, a plurality of video streams, each carrying a respective moving image of one or more users;
   causing the respective moving image of a first of the video streams to be displayed at a user device of the first user for a first time interval;
   detecting a change in the visual content of the respective moving image of a second of the video streams that is not being displayed at the user device during the first time interval, the change in the visual content comprising a change in a total number of users in the respective moving image; and
   in response to detecting said change in the visual content, causing the respective moving image of at least the second stream to be displayed at the user device for a second time interval.

2. The method of claim 1, wherein the computer determines the duration of the second time interval based on the change in the visual content detected in the moving image of the second video stream.

3. The method of claim 1, wherein the change is detected by the computer applying a facial detection algorithm to the respective moving image of the second video stream to detect a change in the total number of faces in the moving image of the second video stream during the first time interval.

4. The method of claim 1, wherein the change is detected by the computer applying a skeletal tracking algorithm to the respective moving image of the second video stream to detect a change in the total number of skeletons in the moving image of the second video stream during the first time interval.

5. The method of claim 1, wherein the computer assigns a first priority value to the second video stream for the first time interval, and in response to detecting the change in the visual content, assigns a second priority value denoting a higher priority to the stream; and
   wherein the computer uses the second priority value to select the second stream from the plurality of video streams for said displaying at the user device for the second time interval.

6. The method of claim 1, wherein causing at least the respective moving image of the second video stream to be displayed at the user device comprises causing the respective moving image of the first video stream to be replaced with that of the second video stream, such that the respective moving image of first video stream is not displayed at the user device for the second time interval.

7. The method of claim 1, wherein both the moving images of the first and second video streams are displayed simultaneously at the user device for the second time interval.

8. The method of claim 1 wherein the respective moving image of a third of the video streams is displayed at the user device in the first time interval in addition to the first video stream, and the computer causes the respective moving image of the third video stream to be replaced with that of the second video stream, such that the respective moving image of the third video stream is not displayed at the user device for the second time interval.

9. The method of claim 1, comprising in response to detecting said change in the visual content, selecting one of a plurality of predetermined layouts for displaying the respective moving image of the second video stream at the user device for the second time interval, wherein each of the plurality of predetermined layouts is for displaying a different number of video streams at the user device, wherein a different one of the predetermined layouts is used to display the respective moving image of the first stream in the first time interval.

10. The method of claim 1, wherein at least two of the plurality of streams are received from different communication client instances, each of the different communication client instances being executed at a different user device.

11. The method of claim 10, wherein each of the video streams is received from a different communication client instance executed on a different user device.

12. The method of claim 1, wherein the computer is separate from the user device and wherein the computer causes the moving image of each of the first and second video streams to be displayed at the user device, by transmitting that stream to the user device via the network for displaying thereat.

13. The method of claim 1, wherein the computer is embodied in a server.

14. The method according to claim 1, wherein the computer is embodied in the user device.

15. A computer for effecting a communication event between a first user and one or more second users via a communication network, the computer comprising:
- a network interface configured to receive, via the network, a plurality of video streams, each carrying a respective moving image of one or more users;
- a processor configured to perform operations of:
  - causing the respective moving image of a first of the video streams to be displayed at a user device of the first user for a first time interval;
  - detecting a change in the visual content of the respective moving image of a second of the video streams that is not being displayed at the user device during the first time interval, the change in the visual content comprising a change in a total number of users in the respective moving image; and
  - in response to detecting said change in the visual content, causing the respective moving image of at least the second stream to be displayed at the user device for a second time interval.

16. The computer of claim 15, wherein the processor is configured to determine the duration of the second time interval based on the change in the visual content detected in the moving image of the second video stream.

17. The method of claim 15 wherein the change is detected by applying a facial detection algorithm to the respective moving image of the second video stream to detect a change in the total number of faces in the moving image of the second video stream during the first time interval.

18. The method of claim 15, wherein the change is detected by applying a skeletal tracking algorithm to the respective moving image of the second video stream to detect a change in the total number of skeletons in the moving image of the second video stream during the first time interval.

19. A computer program product for effecting a communication event between a first user and one or more second users via a communication network, the computer program product comprising code stored on a computer readable storage medium and configured when executed on a computer to perform the following operations:
- receiving, via the network, a plurality of video streams, each carrying a respective moving image of one or more users;
- causing the respective moving image of a first of the video streams to be displayed at a user device of the first user for a first time interval;
- detecting a change in the visual content of the respective moving image of a second of the video streams that is not being displayed at the user device during the first time interval, the change in the visual content comprising a change in a total number of users in the respective moving image; and
- in response to detecting said change in the visual content, causing the respective moving image of at least the second stream to be displayed at the user device for a second time interval.

20. The computer program product of claim 19, wherein the change is detected by applying a facial detection algorithm to the respective moving image of the second video stream to detect a change in the total number of faces in the moving image of the second video stream during the first time interval.

* * * * *